US010798768B2

United States Patent
Fujishiro et al.

(10) Patent No.: US 10,798,768 B2
(45) Date of Patent: Oct. 6, 2020

(54) RADIO TERMINAL AND BASE STATION

(71) Applicant: KYOCERA CORPORATION, Kyoto (JP)

(72) Inventors: Masato Fujishiro, Yokohama (JP); Yushi Nagasaka, Ritto (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/052,426

(22) Filed: Aug. 1, 2018

(65) Prior Publication Data

US 2018/0376530 A1 Dec. 27, 2018

Related U.S. Application Data

(63) Continuation of application No. PCT/JP2017/004005, filed on Feb. 3, 2017.
(Continued)

(51) Int. Cl.
| | |
|---|---|
| *H04W 76/18* | (2018.01) |
| *H04W 76/27* | (2018.01) |
| *H04W 24/10* | (2009.01) |
| *H04W 28/02* | (2009.01) |
| *H04W 88/06* | (2009.01) |

(Continued)

(52) U.S. Cl.
CPC ........... *H04W 76/18* (2018.02); *H04W 24/10* (2013.01); *H04W 28/02* (2013.01); *H04W 76/27* (2018.02); *H04W 88/06* (2013.01); *H04W 28/085* (2013.01); *H04W 36/14* (2013.01); *H04W 76/16* (2018.02); *H04W 84/12* (2013.01)

(58) Field of Classification Search
CPC . H04W 16/14; H04W 72/1268; H04W 72/14; H04W 74/004; H04W 74/04; H04W 48/10; H04W 52/146; H04W 52/40; H04W 72/0406; H04W 88/06; H04L 1/1861
See application file for complete search history.

(56) References Cited

U.S. PATENT DOCUMENTS

| | | | | |
|---|---|---|---|---|
| 2014/0094159 A1* | 4/2014 | Raleigh | ................. | H04W 24/02 455/418 |
| 2015/0341840 A1* | 11/2015 | Lee | ....................... | H04W 24/08 455/437 |
| 2016/0198399 A1 | 7/2016 | Kim et al. | | |

FOREIGN PATENT DOCUMENTS

WO 2015/137667 A1 9/2015

OTHER PUBLICATIONS

Huawei; "Summary of email discussion: [91bis#18][LTE/WiFi] LTE/WLAN Interworking enhancements"; 3GPP TSG-RAN WG2 #92; R2-156592; Nov. 16-20, 2015; 12 pages; Anaheim, U.S.A.
(Continued)

*Primary Examiner* — Yemane Mesfin
*Assistant Examiner* — Mon Cheri S Davenport
(74) *Attorney, Agent, or Firm* — Studebaker & Brackett PC

(57) ABSTRACT

A radio terminal according to an embodiment includes an AS entity configured to perform communication with a base station of a WWAN and an upper entity positioned at a higher layer than the AS entity. The AS entity transmits, to the base station, a report indicating that connection to the WLAN has failed, in response to a failure in the connection to the WLAN. The AS entity releases configuration information including a steering command in response to the failure in the connection to the WLAN and provides a notification indicating that traffic has to be returned from the WLAN to the upper entity.

2 Claims, 14 Drawing Sheets

Related U.S. Application Data

(60) Provisional application No. 62/290,645, filed on Feb. 3, 2016.

(51) Int. Cl.
*H04W 84/12* (2009.01)
*H04W 36/14* (2009.01)
*H04W 28/08* (2009.01)
*H04W 76/16* (2018.01)

(56) References Cited

OTHER PUBLICATIONS

MediaTek Inc.; On the relationship between Release-13 and Release-12 LTE-WLAN Interworking; 3GPP TSG-RAN2#92 meeting; Tdoc R2-156718; Nov. 16-20, 2015; 3 pages; Anaheim, U.S.A.
Catt.; Considerations on Interworking Enhancements; 3GPP TSG RAN WG2 Meeting #90; R2-152128; May 25-29, 2015; 3 pages; Fukuoka, Japan.

* cited by examiner

FIG. 11

```
WLAN-OffloadConfig-r12 ::=              SEQUENCE {
   thresholdRSRP-r12                        SEQUENCE {
       thresholdRSRP-Low-r12                    RSRP-Range,
       thresholdRSRP-High-r12                   RSRP-Range
   }
   OPTIONAL, -- Need OR
   thresholdRSRQ-r12                        SEQUENCE {
       thresholdRSRQ-Low-r12                    RSRQ-Range,
       thresholdRSRQ-High-r12                   RSRQ-Range
   }
   OPTIONAL, -- Need OR
   thresholdRSRQ-OnAllSymbolsWithWB-r12     SEQUENCE {
       thresholdRSRQ-OnAllSymbolsWithWB-Low-r12         RSRQ-Range,
       thresholdRSRQ-OnAllSymbolsWithWB-High-r12        RSRQ-Range
   }
   OPTIONAL, -- Need OP
   thresholdRSRQ-OnAllSymbols-r12           SEQUENCE {
       thresholdRSRQ-OnAllSymbolsLow-r12                RSRQ-Range,
       thresholdRSRQ-OnAllSymbolsHigh-r12               RSRQ-Range
   }
   OPTIONAL, -- Need OP
   thresholdRSRQ-WB-r12                     SEQUENCE {
       thresholdRSRQ-WB-Low-r12                 RSRQ-Range,
       thresholdRSRQ-WB-High-r12                RSRQ-Range
   }
   OPTIONAL, -- Need OP thresholdChannelUtilization-r12          SEQUENCE {
       thresholdChannelUtilizationLow-r12       INTEGER (0..255),
       thresholdChannelUtilizationHigh-r12      INTEGER (0..255)
   }
   OPTIONAL, -- Need OR
   thresholdBackhaul-Bandwidth-r12          SEQUENCE {
       thresholdBackhaulDL-BandwidthLow-r12     WLAN-backhaulRate-r12,
       thresholdBackhaulDL-BandwidthHigh-r12    WLAN-backhaulRate-r12,
       thresholdBackhaulUL-BandwidthLow-r12     WLAN-backhaulRate-r12,
       thresholdBackhaulUL-BandwidthHigh-r12    WLAN-backhaulRate-r12
   }
   OPTIONAL, -- Need OR
   thresholdBeaconRSSI-r12                  SEQUENCE {
       thresholdBeaconRSSI-Low-r12              INTEGER (0..255),
       thresholdBeaconRSSI-High-r12             INTEGER (0..255)
   }
   OPTIONAL, -- Need OR
   offloadPreferenceIndicator-r12           BIT STRING (SIZE (16))
   OPTIONAL, -- Need OR
   t-SteeringWLAN-r12                       T-Reselection
   OPTIONAL, -- Need OR
   steeringCommand-r13                      CHOICE {
       toWLAN-r13                               ToWLAN-r13,
       toLTE                                    ENUMERATED {toLTE}
   }           -- Cond woRAP      ...
}

ToWLAN-r13                           SEQUENCE {
      lwa-MobilityPart-r13                  LWA-MobilityPart-r13    OPTIONAL,
      ...
   }
```

| Conditional presence | Explanation |
|---|---|
| woRAP | The field can be provided only when dedicated RAN assistance parameters are not be provided. |

FIG. 14

```
-- ASN1START

LWA-Configuration-r13 ::=        CHOICE { release                      NULL, setup                        SEQUENCE { lwa-ConfigPart-r13           LWA-ConfigPart-r13,    ...

},

...

}

LWA-ConfigPart-r13 ::=   SEQUENCE { radioResourceConfigDedicatedLWA-r13    RadioResourceConfigDedicatedLWA-r13

OPTIONAL,    -- Need ON lwa-MobilityPart-r13          LWA-MobilityPart-r13       OPTIONAL,         --
Need ON lwa-WT-Counter-r13        INTEGER (0..65535)         OPTIONAL,    -- Need ON

...

}

LWA-MobilityPart-r13 ::=     SEQUENCE { wlan-ToReleaseList-r13         WLAN-Id-List-r13          OPTIONAL,    -- Need
ON wlan-ToAddList-r13             WLAN-Id-List-r13          OPTIONAL,    -- Need
ON lwa-AssociationTimer-r13       ENUMERATED {s10, s30, s60, s120, s240, spare3,
spare2, spare1}    OPTIONAL,    -- Need OP recovery-Report-r13            ENUMERATED {true}         OPTIONAL,    -- Need
ON

...

}

WLAN-Id-List-r13 ::=           SEQUENCE (SIZE (1..maxWLAN-Id-r13)) OF WLANntifiers-r12

-- ASN1STOP
```

FIG. 15

```
-- ASN1START

WLAN-Status-r13 ::=    ENUMERATED {successfulAssociation, failureRadioLink, failureInternal, failureOther, failureTimeout, failureConnReject, recovery,...}

-- ASN1STOP
```

RADIO TERMINAL AND BASE STATION

RELATED APPLICATION

This application is a continuation application of international application PCT/JP2017/004005, filed Feb. 3, 2017, which claims the benefit of U.S. Provisional Application No. 62/290,645, filed Feb. 3, 2016, the entire contents of which are incorporated herein by reference.

TECHNICAL FIELD

The present disclosure relates to a radio terminal and a base station in a communication system.

BACKGROUND ART

In recent years, the spread of radio terminals compatible with both a wireless wide area network (WWAN) communication scheme and a wireless local area network (WLAN) communication scheme is proceeding.

In order to provide high-speed and large-capacity communication services to such radio terminals, technologies for enhancing cooperation between the WWAN and the WLAN are being studied in the Third Generation Partnership Project (3GPP).

SUMMARY

A radio terminal according to an embodiment includes a controller configured to perform traffic steering for transferring traffic between the radio terminal and a core network from a WWAN to a WLAN. The controller comprises a first entity configured to perform communication with a base station of the WWAN, and a second entity positioned at a higher layer than the first entity. The first entity is configured to perform: a first process of receiving, from the base station, configuration information including a steering command instructing the traffic steering; a second process of providing, to the second entity, a first notification indicating that traffic has to be transferred to the WLAN, in response to reception of the steering command; a third process of transmitting, to the base station, a report indicating that connection to the WLAN has failed, in response to a failure in the connection to the WLAN after receiving the steering command; and a fourth process of releasing the configuration information in response to the failure in the connection to the WLAN and providing, to the second entity, a second notification indicating that traffic has to be returned from the WLAN.

A radio terminal according to an embodiment has a function of RAN controlled LTE WLAN interworking (RCLWI) and a function of RAN assisted LTE WLAN interworking (RALWI). The radio terminal includes: a receiver configured to receive, from a network, first information for configuring the RCLWI and second information for configuring the RALWI; and a controller configured to perform only the RCLWI among the RCLWI and the RALWI if both the first information and the second information are received in a connected mode.

A radio terminal according to an embodiment includes a controller configured to receive, from a WWAN, a steering command instructing traffic steering and try the traffic steering. The traffic steering is a process of transferring traffic between the radio terminal and a core network from the WWAN to a WLAN with granularity of APN. The controller is configured to start a timer configured from the WWAN in response to reception of the steering command. The timer defines a period during which the radio terminal tries the traffic steering and/or a period during which the steering command is valid.

A base station according to an embodiment includes a controller configured to transmit, to a radio terminal, a steering command instructing traffic steering. The traffic steering is a process of transferring traffic between the radio terminal and a core network from the WWAN to a WLAN with granularity of APN. The controller is configured to configure, to the radio terminal, a timer that defines a period during which the radio terminal tries the traffic steering and/or a period during which the steering command is valid.

A radio terminal according to an embodiment includes a controller configured to receive, from a WWAN, an assistance parameter for the radio terminal to determine traffic steering between the WWAN and a WLAN, and a steering command instructing the traffic steering between the WWAN and the WLAN. The controller is configured to receive, from the WWAN, information used for determining which of the assistance parameter and the steering command has to be applied, and to apply one of the assistance parameter and the steering command based on the information.

A base station according to an embodiment includes a controller configured to transmit, to a radio terminal, an assistance parameter for the radio terminal to determine the traffic steering between the WWAN and the WLAN, and a steering command instructing the traffic steering between the WWAN and the WLAN. The controller further transmits, to the radio terminal, information used for determining which of the assistance parameter and the steering command has to be applied to the radio terminal.

BRIEF DESCRIPTION OF DRAWINGS

FIG. 11 is a diagram illustrating a steering command according to another embodiment.

FIG. 14 is a diagram illustrating LWA-Configuration according to supplementary node.

FIG. 15 is a diagram illustrating WLAN-Status according to supplementary node.

DESCRIPTION OF EMBODIMENTS

Summary of Embodiments

Figure 1:
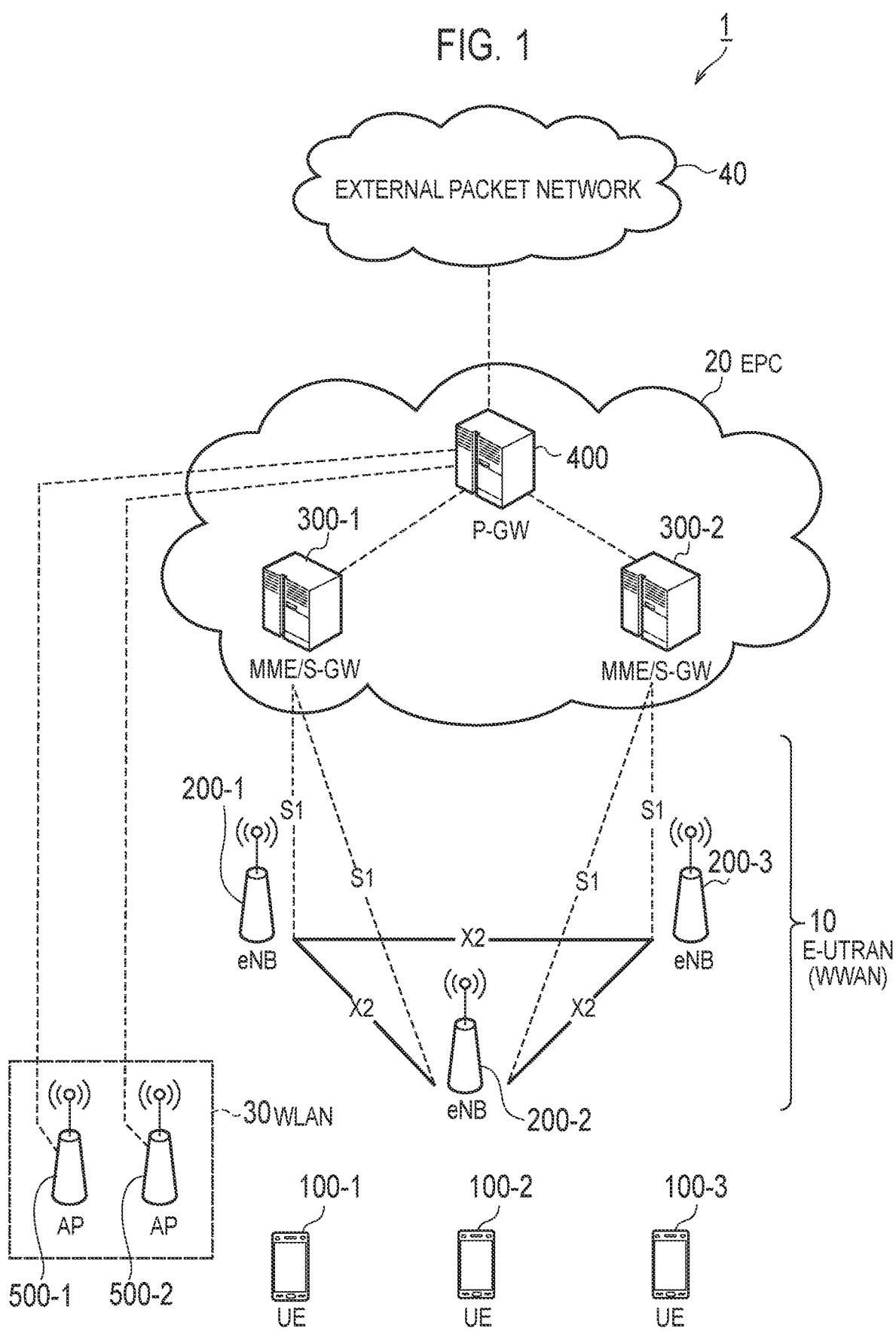
FIG. 1 is a diagram illustrating a communication system according to an embodiment.

A radio terminal according to first and second embodiments includes a controller that receives a steering command instructing traffic steering from a WWAN and tries the traffic steering. The traffic steering is a process of transferring traffic between the radio terminal and a core network from the WWAN to a WLAN with the granularity of APN. In response to reception of the steering command, the controller starts a timer configured from the WWAN. The timer defines a period during which the radio terminal tries the traffic steering and/or a period during which the steering command is valid.

In the first embodiment, the controller includes an AS entity that performs communication with the base station of the WWAN and an upper entity that performs communication with the core network. The AS entity manages the timer. The AS entity may notify the upper entity of the timer in response to the reception of the steering command.

In the first embodiment, the controller may determine that the traffic steering is successful when a first condition or a second condition is satisfied. The first condition is a condition that the traffic steering is possible for at least one APN. The second condition is a condition that the traffic steering is completed for at least one APN.

In the first embodiment, if the traffic steering is not successful while the timer is running, the controller may transmit, to the WWAN, a report indicating failure of the traffic steering.

In the first embodiment, the controller includes an AS entity that performs communication with the base station of the WWAN and an upper entity that performs communication with the core network. The AS entity manages the timer. The AS entity may stop applying the steering command and/or perform a notification to the upper entity if the traffic steering is not successful while the timer is running.

In the first embodiment, the controller may receive, from the WWAN, a second steering command instructing a second traffic steering from the WLAN to the WWAN. The controller may start a predetermined timer configured from the WWAN in response to reception of the second steering command. The controller may transmit, to the WWAN, a report indicating failure of the second traffic steering if the second traffic steering is not successful while the predetermined timer is running.

In the second embodiment, the controller receives, from the WWAN, an assistance parameter that is different from the steering command. The assistance parameter includes a parameter for the radio terminal to determine traffic steering between the WWAN and the WLAN. The controller may stop applying the assistance parameter while the timer is running.

In the second embodiment, if the timer expires, the controller may restarts applying the assistance parameter.

In the second embodiment, if the radio terminal is in an idle mode of the WWAN, the controller may stop applying the assistance parameter while the timer is running.

In a second embodiment, the steering command may include a WLAN evaluation parameter for the radio terminal to evaluate the WLAN. The controller evaluates the WLAN by using the WLAN evaluation parameter after the traffic steering.

A base station according to the first and second embodiments includes a controller that transmits, to the radio terminal, a steering command instructing traffic steering. The traffic steering is a process of transferring traffic between the radio terminal and the core network from the WWAN to the WLAN with the granularity of APN. The controller configures, to the radio terminal, a timer that defines a period during which the radio terminal tries the traffic steering and/or a period during which the steering command is valid.

In the first embodiment, if handover of the radio terminal is performed on a neighbour adjacent base station, the controller may notify the neighbour base station of the steering command and/or the timer.

A radio terminal according to a third embodiment includes a controller that receives, from a WWAN, an assistance parameter for the radio terminal to determine traffic steering between the WWAN and a WLAN, and a steering command instructing the traffic steering between the WWAN and the WLAN. The controller receives, from the WWAN, information used for determining which of the assistance parameter and the steering command has to be applied, and applies one of the assistance parameter and the steering command based on the information.

In the third embodiment, the information may be broadcast information indicating stop of application of the assistance parameter. The controller may stop applying the assistance parameter in response to reception of the broadcast information.

In the third embodiment, the information may be measurement configuration information that configures WLAN measurement. The controller may stop applying the assistance parameter in response to reception of the measurement configuration information.

In the third embodiment, the information may be information that configures an operation after the radio terminal transitions to an idle mode of the WWAN. The controller may perform the operation configured by the information after transitioning to the idle mode.

The base station according to the third embodiment includes a controller that transmits, to the radio terminal, an assistance parameter for the radio terminal to determine the traffic steering between the WWAN and the WLAN, and a steering command instructing the traffic steering between the WWAN and the WLAN. The controller further transmits, to the radio terminal, information used for determining which of the assistance parameter and the steering command has to be applied to the radio terminal.

[Architecture of Communication System]

The architecture of the communication system according to the embodiment will be described.

FIG. 1 is a diagram illustrating a communication system 1 according to an embodiment. As illustrated in FIG. 1, the communication system 1 includes a user equipment (UE) 100, an evolved-UMTS terrestrial radio access network (E-UTRAN) 10, an evolved packet core (EPC) 20, a WLAN 30, and an external packet network 40. The UE 100 corresponds to a radio terminal. The E-UTRAN 10 is a radio access network (RAN) of Long Term Evolution (LTE). The E-UTRAN 10 corresponds to a WWAN. In addition, the EPC 20 corresponds to a core network.

The UE 100 is a terminal compatible with both LTE communication and WLAN communication. The UE 100 has a function of performing radio communication with an evolved Node-B (eNB) 200. In addition, the UE 100 has a function of performing radio communication with a WLAN access point (AP) 500. In an embodiment, the UE 100 supports LTE-WLAN interworking (LWI). The summary of the LWI and the architecture of the UE 100 will be described later.

The E-UTRAN 10 includes an eNB 200. The eNB 200 corresponds to a base station. The eNB 200 manages one or more cells. The eNB 200 performs radio communication with the UE 100 that has established connection with the cell. The eNB 200 has a radio resource management (RRM) function, a user data (hereinafter, simply referred to as "data") routing function, a measurement control function for mobility control and scheduling, and the like. The "cell" is used as the term indicating a minimum unit of radio communication area. The "cell" is used as the term indicating a function of performing radio communication with the UE 100.

The EPC 20 includes a mobility management entity (MME)/serving-gateway (S-GW) 300 and a packet data network gateway (P-GW) 400. The MME performs various types of mobility control or the like on the UE 100. The S-GW performs data transfer control. The MME/S-GW 300 is connected to the eNB 200 via an S1 interface. The P-GW 400 has a function as a connection point with an external packet network 40. The P-GW 400 has a function as a connection point with the WLAN 30. The P-GW 400 performs allocation of an IP address to the UE 100, authentication at the time of bearer establishment, and the like. The P-GW 400 performs control to relay user data from the external packet network 40. The P-GW 400 performs control to relay user data to the external packet network 40. An enhanced packet data gateway (ePDG) may be provided between the WLAN AP 500 and the P-GW 400. The ePDG is an endpoint on the EPC 20 side for establishing an IPSec tunnel with the UE 100 so as to accommodate WLANs that cannot be trusted for security.

The WLAN 30 includes a WLAN AP 500. The WLAN AP 500 is configured in conformity with, for example, the IEEE 802.11 standard. The WLAN AP 500 performs WLAN communication with the UE 100 connected to the AP. It should be noted that the eNB 200 may have the function of the AP. Such a scenario is referred to as a collocated scenario. The WLAN 30 may include a WLAN termination (WT) that terminates an Xw interface with the eNB 200. The WT is connected to the eNB 200 via the Xw interface.

The external packet network 40 is provided outside the EPC 20. The external packet network 40 is a packet network such as Internet and/or an operator service network.

Figure 2:
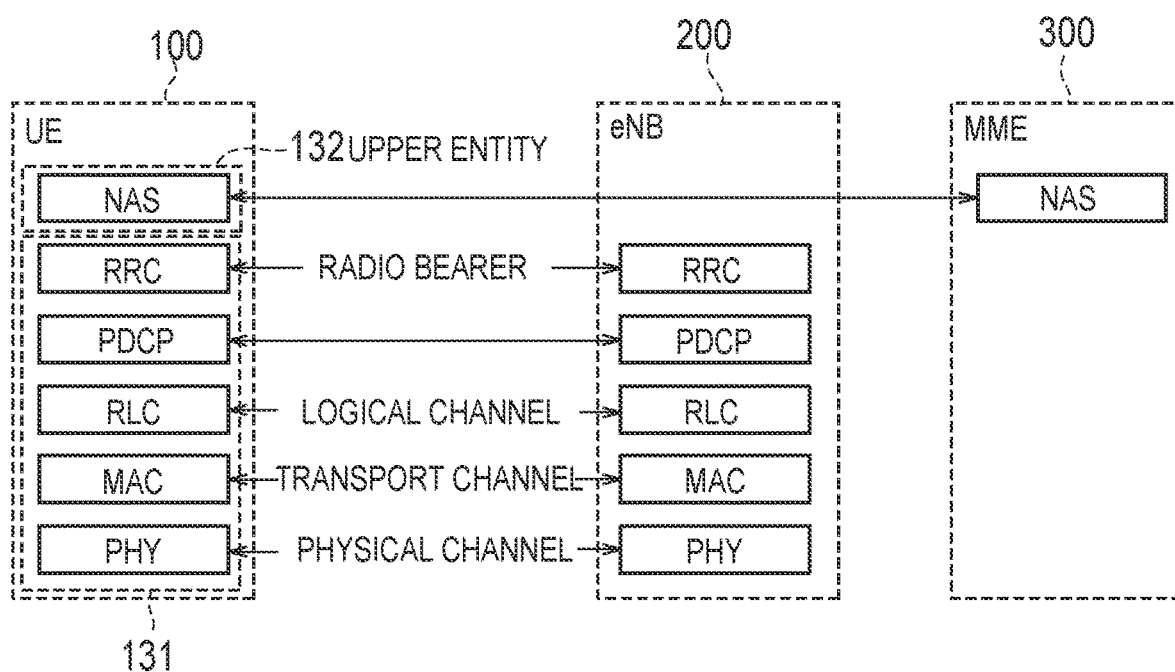
FIG. 2 is a diagram illustrating a protocol stack of a radio interface of an LTE.

FIG. 2 is a diagram illustrating a protocol stack of a radio interface of an LTE. As illustrated in FIG. 2, a radio interface protocol is divided into first to third layers of an OSI reference model. The first layer includes a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. Data and control signals are transmitted between the PHY layer of the UE 100 and the PHY layer of the eNB 200 via a physical channel.

The MAC layer performs priority control of data, a retransmission process by hybrid ARQ (HARQ), a random access procedure, and the like. Data and control signals are transmitted between the MAC layer of the UE 100 and the MAC layer of the eNB 200 via a transport channel. The MAC layer of the eNB 200 includes a scheduler. The scheduler determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. Data and control signals are transmitted between the RLC layer of the UE 100 and the RLC layer of the eNB 200 via a logical channel.

The PDCP layer performs header compression and decompression, and encryption and decryption.

The RRC layer is defined only in a control plane that handles the control signals. Signaling (RRC signaling) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected mode (connected mode). If there is no connection (RRC connection) between the RRC of the UE 100 and the RRC of the eNB 200, the UE 100 is in an RRC idle mode (idle mode).

A non-access stratum (NAS) layer, which is located above the RRC layer, performs session management, mobility management, and the like. The NAS layer of the UE 100 performs communication with the EPC 20 (for example, the MME 300).

The PHY layer, the MAC layer, the RLC layer, the PDCP layer, and the RRC layer constitute an access stratum (AS) entity that performs communication with the eNB 200. In addition, the NAS layer constitutes an upper entity 132 positioned higher than the AS entity 131.

[Summary of LWI]

Figure 3:
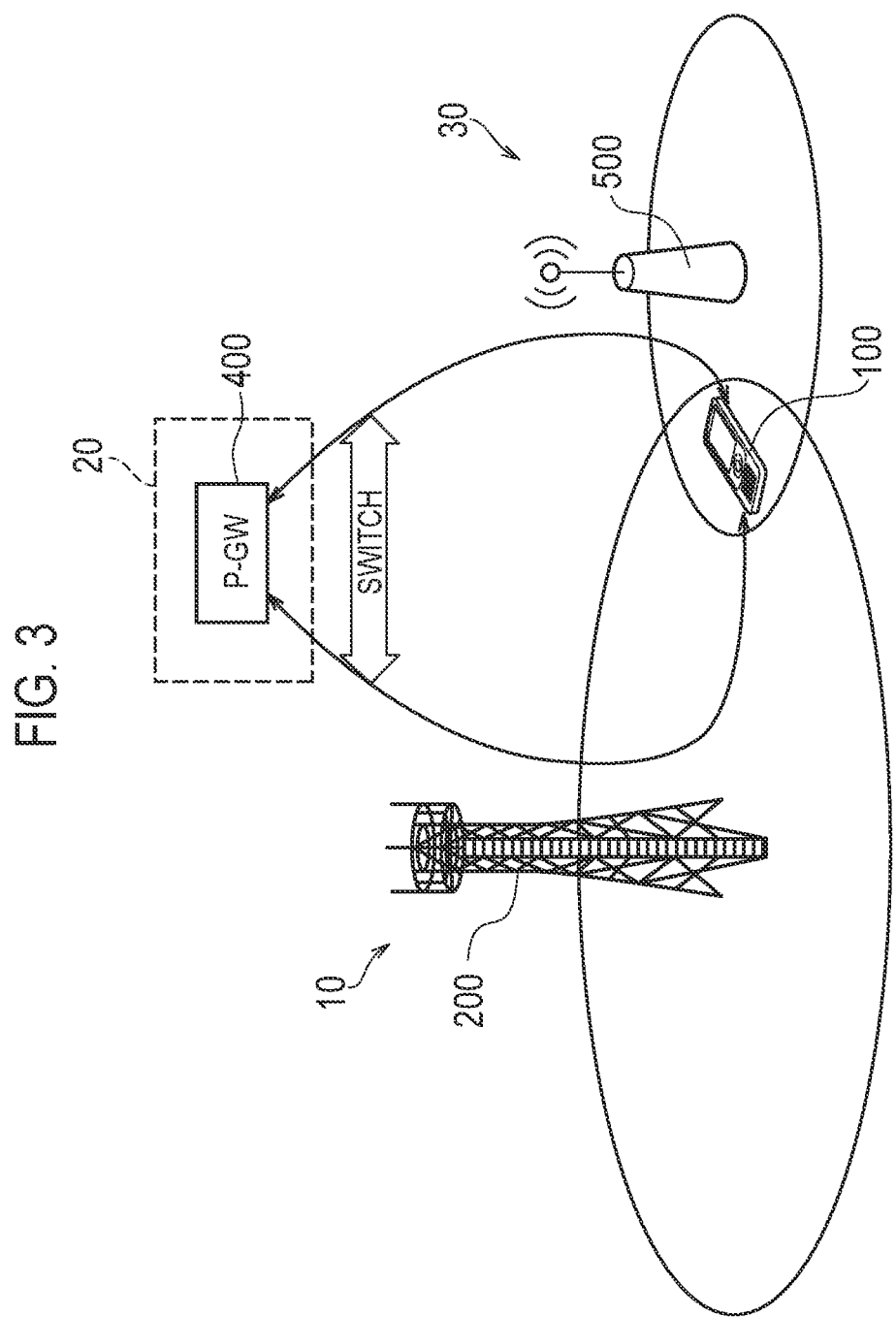
FIG. 3 is a diagram illustrating the summary of LWI.

The summary of LWI will be described. FIG. 3 is a diagram illustrating the summary of LWI.

As illustrated in FIG. 3, the LWI is a technology for performing traffic steering with the granularity of access point name (APN) between the E-UTRAN 10 (WWAN) and the WLAN 30. The APN has the same meaning as packet data network (PDN) connection. The traffic steering includes traffic steering from the E-UTRAN 10 to the WLAN 30 and traffic steering from the WLAN 30 to the E-UTRAN 10.

The LWI includes RAN assisted LTE WLAN interworking (RALWI) and RAN controlled LTE WLAN interworking (RCLWI). The RALWI is a UE-based LWI. The UE 100 performs traffic steering without requiring an instruction from eNB 200. The RCLWI is an eNB-based LWI. The eNB 200 instructs the traffic steering to the UE 100.

LTE-WLAN aggregation (LWA) is a technology similar to the LWI. Differences between the LWI and the LWA will be described. First, the LWI handles traffic in APN units, whereas the LWA handles traffic in bearer units. Second, the LWI performs traffic switching and its decision by the EPC 20, whereas the LWA performs traffic switching and its decision by the eNB 200. Third, the LWI applies to both uplink and downlink, whereas the LWA applies only to downlink.

(RALWI)

The RALWI is a technology in which the UE 100 in RRC idle mode and the UE 100 in RRC connected mode perform bidirectional traffic steering with the aid of the E-UTRAN 10. The E-UTRAN 10 (eNB 200) provides RAN assistance parameters to the UE 100 by broadcast RRC signaling or dedicated RRC signaling.

The RAN assistance parameters include an E-UTRAN signal strength threshold, a WLAN channel utilization threshold, a WLAN backhaul data rate threshold, a WLAN signal strength threshold, and the like. The eNB 200 provides a list of WLAN identifiers to the UE 100 by broadcast signaling.

The AS entity 131 of the UE 100 determines whether a predefined rule has been satisfied, based on the RAN assistance parameters. Such a rule is referred to as a RAN rule. If the RAN rule is satisfied, the AS entity 131 notifies the upper entity 132 to that effect. The upper entity 132 performs the traffic steering decision.

(RCLWI)

The RCLWI is a technology in which the UE 100 in the RRC connected mode performs bidirectional traffic steering under the control of the eNB 200. The eNB 200 configures the WLAN measurement to the UE 100. The WLAN measurement configuration can set a WLAN identifier, a WLAN channel number, and a WLAN band as a measurement object. The UE 100 triggers the WLAN measurement report process by using received signal strength indicator (RSSI). The WLAN measurement report includes an RSSI, a channel utilization rate, the number of stations, allowable capacity, a backhaul rate, a WLAN identifier, and the like.

The eNB 200 transmits, to the UE 100, a steering command instructing traffic steering, based on the WLAN measurement report. The steering command includes a first method and a second method.

The first method uses a special RAN assistance parameter as a steering command. For example, the eNB 200 transmits, to the UE 100, a threshold (for example, E-UTRAN signal strength threshold and WLAN signal strength threshold) set to +/− infinity by dedicated signaling.

In the second method, a new steering command is introduced. The eNB 200 transmits, to the UE 100, a steering command indicating traffic steering to the WLAN 30 or traffic steering to the eNB 200.

The AS entity 131 of the UE 100 notifies the upper entity 132 of the reception of the steering command. The upper entity 132 determines which traffic is offloadable to the WLAN 30.

If the traffic steering cannot be completed, the UE 100 that is configured to perform the traffic steering (offloading) to the WLAN 30 transmits, to the eNB 200, a report including information indicating a traffic steering failure (WLAN connection failure). Such a report is referred to as a WLAN connection status report. The WLAN connection status report provides, to the eNB 200, feedback relating to the situation of the WLAN 30. In the following, the WLAN connection status report including the WLAN connection failure is referred to as a "WLAN failure report".

First Embodiment

A first embodiment will be described below.

(Radio Terminal)

Figure 4:
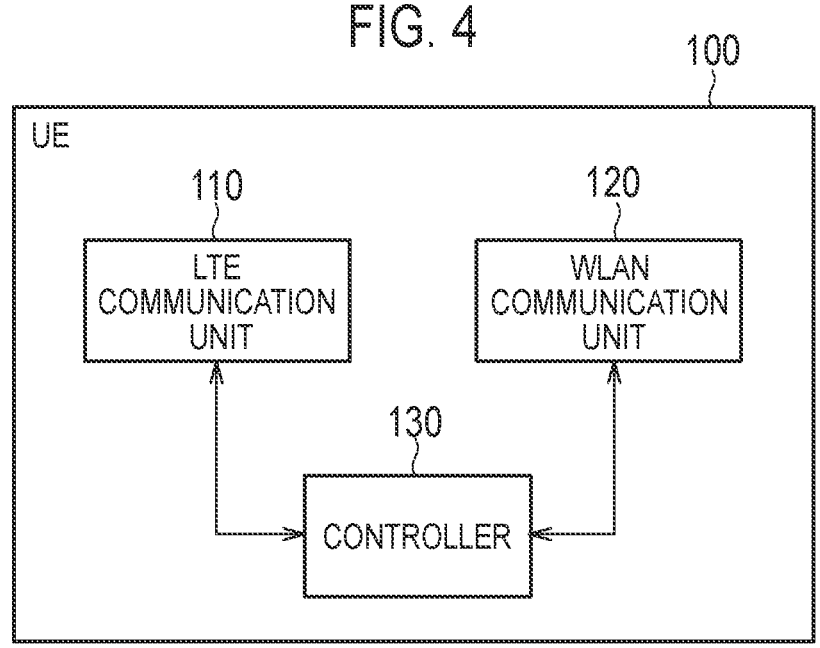
FIG. 4 is a diagram illustrating an architecture of a UE (radio terminal) according to an embodiment.

FIG. 4 is a diagram illustrating an architecture of a UE 100 (radio terminal) according to a first embodiment. As illustrated in FIG. 4, the UE 100 includes an LTE communication unit 110, a WLAN communication unit 120, and a controller 130.

The LTE communication unit 110 performs LTE communication under the control of the controller 130. The LTE communication unit 110 includes an antenna, a transmitter, and a receiver. The transmitter converts a baseband signal (transmission signal) output by the controller 130 into an LTE radio signal. The transmitter transmits the LTE radio signal from the antenna. The receiver converts an LTE radio signal received by the antenna into a baseband signal (reception signal). The receiver outputs the baseband signal to the controller 130

The WLAN communication unit 120 performs WLAN communication under the control of the controller 130. The WLAN communication unit 120 includes an antenna, a transmitter, and a receiver. The transmitter converts a baseband signal (transmission signal) output by the controller 130 into a WLAN radio signal. The transmitter transmits the WLAN radio signal from the antenna. The receiver converts a WLAN radio signal received by the antenna into a baseband signal (reception signal). The receiver outputs the baseband signal to the controller 130

The controller 130 performs a variety of control on the UE 100. The controller 130 includes a processor and a memory. The memory stores a program executed by the processor and information used for processing by the processor. The processor may include a baseband processor and a central processing unit (CPU). The baseband processor modulates and demodulates the baseband signal, encodes and decodes the baseband signal, and the like. The CPU executes a program stored in the memory and performs a variety of processes. The processor performs the various processes described above and various processes described later.

In the first embodiment, the controller 130 receives, from the E-UTRAN 10, a steering command instructing traffic steering and tries traffic steering. The traffic steering is a process of transferring traffic between the UE 100 and the EPC 20 from the E-UTRAN 10 to the WLAN 30 with the granularity of the APN.

The controller 130 starts a timer configured from the E-UTRAN 10 in response to reception of the steering command. The timer may be configured by the steering command. The timer may be configured by signaling (dedicated RRC signaling or broadcast RRC signaling) different from the steering command. The timer defines a period during which the UE 100 tries the traffic steering and/or a period during which the steering command is valid. The timer may include a first timer that defines the period during which the UE 100 tries the traffic steering and a second timer that defines the period during which the steering command is valid.

The first timer is started at a timing when the steering command is received. The first timer is stopped at a timing when the traffic steering to the WLAN 30 is successful. When the first timer expires, the controller 130 transmits a WLAN failure report to the E-UTRAN 10. As such, the first timer is a timer that determines a transmission condition (trigger condition) of the WLAN failure report. While the first timer is running, the controller 130 continues to try the traffic steering to the WLAN 30. For example, while the first timer is running, the controller 130 has to retry the connection to the WLAN 30 even if the connection to the WLAN 30 fails.

The second timer is started at a timing when the steering command is received. The second timer may be stopped at a timing when the traffic steering to the WLAN 30 is successful. When the second timer expires, the controller 130 (the AS entity 131) stops applying the steering command and/or performs notification (move-traffic-from-WLAN) to the upper entity 132. The application stop of the steering command may be to not use the setting while maintaining the configuration of the steering command, that is, to recognize that the steering command is invalid. The application stop of the steering command may be to release the configuration itself of the steering command. The notification to the upper entity 132 is to notify at least one of, for example, the fact that the timer has expired, the fact that the steering command has become invalid, and the stop of connection retry. The upper entity 132 stops the traffic steering trial in response to the notification. As such, the second timer is a timer that determines an invalidation condition of the steering command.

The first timer and the second timer may be made common and one timer may be used. When the one timer expires, the controller 130 transmits the WLAN failure report to the E-UTRAN 10 and stops applying the steering command and/or performs a notification to the upper entity 132.

The controller 130 includes an AS entity 131 that performs communication with the eNB 200 and an upper entity 132 that performs communication with the EPC 20. The AS entity 131 manages a timer configured from the E-UTRAN 10. The AS entity 131 may notify the upper entity 132 of the timer in response to reception of the steering command. If the traffic steering is not completed even when the timer expires, the upper entity 132 determines that the traffic steering failed. The upper entity 132 may notify the AS entity 131 of the traffic steering failure. The upper entity 132 may notify "timer expiration" as the cause of failure of the traffic steering. In addition, the upper entity 132 may notify the MME 300 of the timer by NAS signaling.

The controller 130 (upper entity 132) may determine that the traffic steering is successful when a first condition or a second condition is satisfied. The first condition is a condition that the traffic steering is possible for at least one APN. If the traffic steering was offloadable for at least one traffic, the upper entity 132 determines that the traffic steering was successful. If the traffic steering is impossible for all traffics, the upper entity 132 determines that the traffic steering failed. The second condition is a condition that the traffic steering has been completed for at least one APN. If the traffic steering was completed for at least one traffic, the upper entity 132 determines that the traffic steering was successful. If the traffic steering could not be completed for all traffic, the upper entity 132 determines that the traffic steering failed. The upper entity 132 notifies the AS entity 131 of whether the traffic steering was successful. In the case of the traffic steering failure, the upper entity 132 may notify the AS entity 131 of the cause of the failure.

The AS entity 131 transmits a WLAN failure report to the E-UTRAN 10 if the traffic steering is not successful while the timer (first timer) is running. The AS entity 131 may include the cause of failure of the traffic steering in the WLAN failure report. If the traffic steering is not successful while the timer (second timer) is running, the AS entity 131 stops applying the steering command and/or performs a notification to the upper entity 132.

(Base Station)

Figure 5:
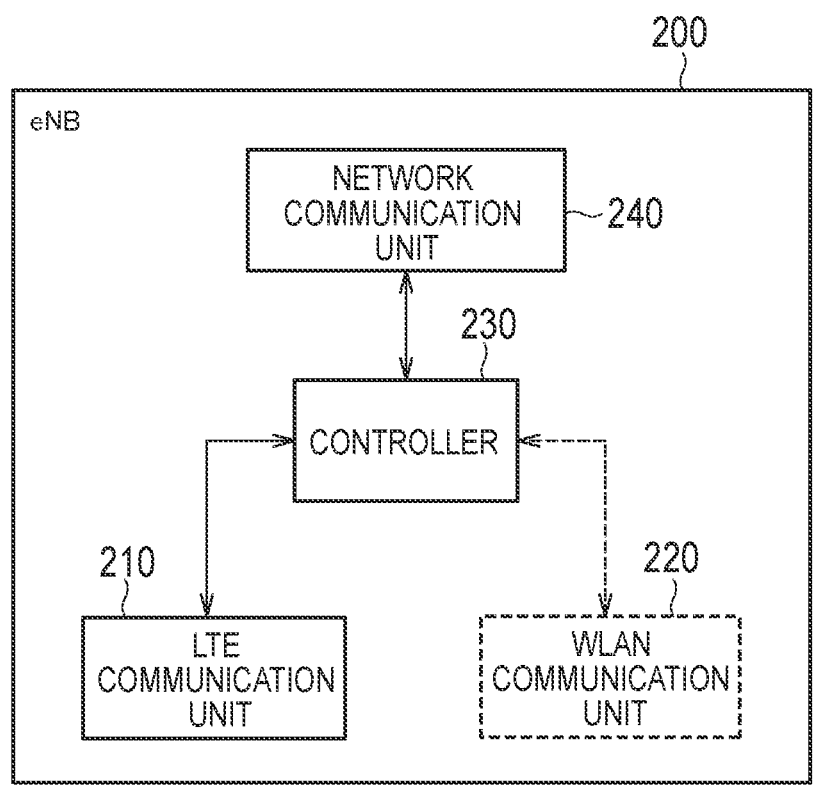
FIG. 5 is a diagram illustrating an architecture of an eNB (base station) according to an embodiment.

FIG. 5 is a diagram illustrating an architecture of an eNB 200 (base station) according to the first embodiment. As illustrated in FIG. 5, the eNB 200 includes an LTE communication unit 210, a controller 230, and a network communication unit 240. In the case of the collocated scenario, the eNB 200 may include a WLAN communication unit 220.

The LTE communication unit 210 performs LTE communication under the control of the controller 230. The LTE communication unit 210 includes an antenna, a transmitter, and a receiver. The transmitter converts a baseband signal (transmission signal) output by the controller 230 into an LTE radio signal. The transmitter transmits the LTE radio signal from the antenna. The receiver converts an LTE radio signal received by the antenna into a baseband signal (reception signal). The receiver outputs the baseband signal to the controller 230

The WLAN communication unit 220 performs WLAN communication under the control of the controller 230. The WLAN communication unit 220 includes an antenna, a transmitter, and a receiver. The transmitter converts a baseband signal (transmission signal) output by the controller 230 into a WLAN radio signal. The transmitter transmits the WLAN radio signal from the antenna. The receiver converts a WLAN radio signal received by the antenna into a baseband signal (reception signal). The receiver outputs the baseband signal to the controller 230

The controller 230 performs a variety of control on the eNB 200. The controller 230 includes a processor and a memory. The memory stores a program executed by the processor and information used for processing by the processor. The processor may include a baseband processor and a CPU. The baseband processor modulates and demodulates the baseband signal, encodes and decodes the baseband signal, and the like. The CPU executes a program stored in the memory and performs a variety of processes. The processor performs the various processes described above and various processes described later.

The network communication unit 240 is connected to the neighbour eNB 200 via the X2 interface. The network communication unit 240 is connected to the EPC 20 (MME/S-GW) via the S1 interface. The network communication unit 240 may be connected to the WT via the Xw interface. The network communication unit 240 is used for communication performed via various network interfaces.

In the first embodiment, the controller 230 transmits, to the UE 100, the steering command instructing the traffic steering to the WLAN 30. The controller 230 configures, to the UE 100, a timer that defines a period during which the UE 100 tries the traffic steering and/or a period during which the steering command is valid.

If the WLAN failure report is received from the UE 100, the controller 230 may determine whether to transmit the steering command to the UE 100 again, based on the cause of failure included in the WLAN failure report.

When the handover of the UE 100 is performed to the neighbour eNB, the controller 230 may notify the neighbour eNB of the steering command and/or the timer configured to the UE 100. Such a notification is made by using a UE context in a handover request message transmitted on the X2 interface. Specifically, the information about the steering command and/or the timer can be included in "AS config." in the UE context. For example, the controller 230 notifies the neighbour eNB of the configuration state of the steering command of the target UE 100. The configuration state of the steering command includes a direction of the traffic steering (the steering to the WLAN 30 or the steering to the E-UTRAN 10). The controller 230 may notify the neighbour eNB of information about to which network (E-UTRAN 10/WLAN 30) the target UE 100 is currently steering the traffic. Therefore, the neighbour eNB 200 can grasp the routing state of the traffic of the target UE 100 as an initial value of control. For example, the neighbour eNB may instruct the traffic steering to the E-UTRAN 10, as appropriate, with respect to the UE 100 being steered to the WLAN 30.

(Operation Sequence 1)

Figure 6:
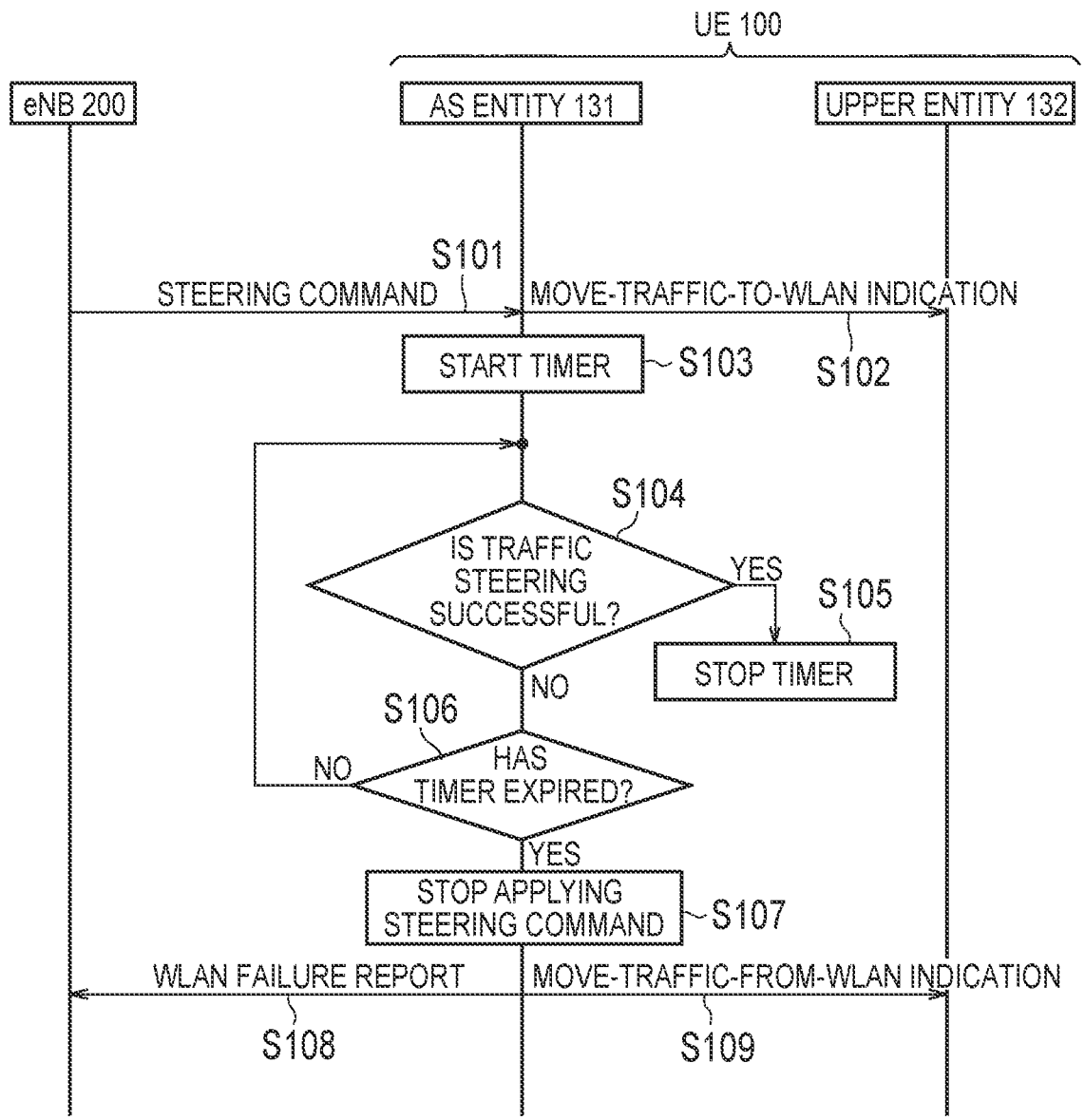
FIG. 6 is a diagram illustrating an operation sequence 1 according to a first embodiment.

FIG. 6 is a diagram illustrating an operation sequence 1 according to the first embodiment. The operation sequence 1 is an operation sequence in the case of using one timer. Prior to this sequence, the UE 100 may transmit a WLAN measurement report to the eNB 200.

As illustrated in FIG. 6, in step S101, the eNB 200 transmits, to the UE 100, a steering command (Steering Command) instructing traffic steering from the E-UTRAN 10 to the WLAN 30. As the steering command, any one of the first method and the second method described above may be applied.

The eNB 200 configures a timer to the UE 100. The timer defines a period during which the UE 100 tries the traffic steering and/or a period during which the steering command is valid. The eNB 200 may configure the timer to the UE 100 by the steering command. The eNB 200 may configure the timer to UE 100 by signaling that is different from the steering command.

In step S102, the AS entity 131 of the UE 100 having received the steering command provides a notification (Move-traffic-to-WLAN indication) of that effect to the upper entity 132. The AS entity 131 may notify the upper entity 132 of the timer configured from the eNB 200 together with the notification (Move-traffic-to-WLAN indication).

In step S103, the AS entity 131 starts the timer. The order of steps S102 and S103 may be reversed, or may be performed at the same time.

In step S104, the AS entity 131 checks whether the traffic steering is successful. For example, the AS entity 131 checks whether the upper entity 132 notified that the traffic steering was successful. If the traffic steering is successful (step S104: YES), the AS entity 131 stops the timer in step S105.

If the traffic steering is not successful (step S104: NO), the AS entity 131 confirms whether the timer has expired in step S106. If the timer has not expired (step S106: NO), the AS entity 131 returns the process to step S104.

If the timer has expired (step S106: YES), the AS entity 131 stops (invalidates) the application of the steering command in step S107.

In step S108, the AS entity 131 transmits a WLAN failure report to the eNB 200.

In step S109, the AS entity 131 performs a notification (move-traffic-from-WLAN) to the upper entity 132. Steps S107 to S109 may be performed in the order different from the order of this sequence, or may be performed at the same time.

(Operation Sequence 2)

Figure 7:
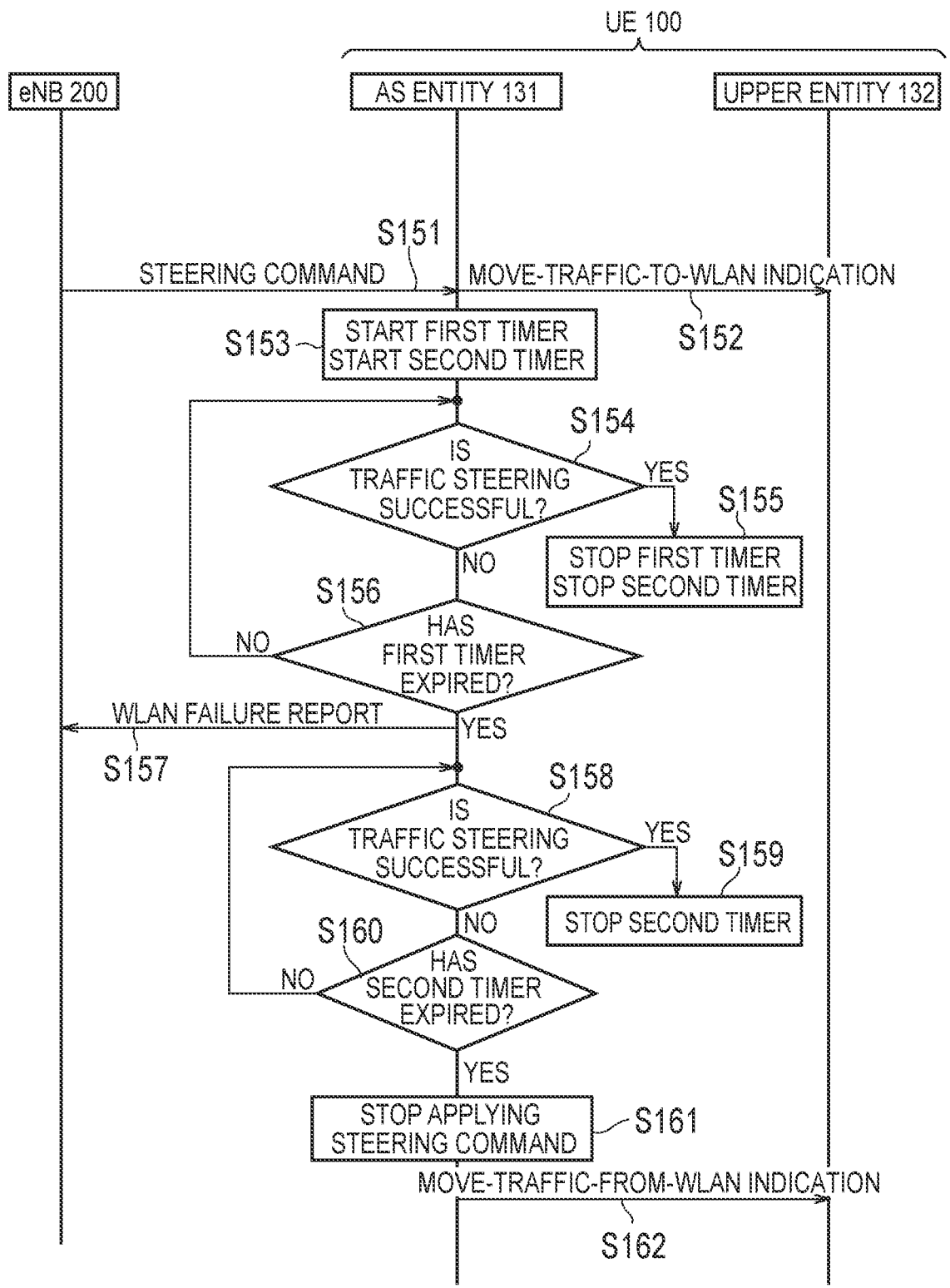
FIG. 7 is a diagram illustrating an operation sequence 2 according to the first embodiment.

FIG. 7 is a diagram illustrating an operation sequence 2 according to the first embodiment. The operation sequence 2 is an operation sequence in the case of using the first timer and the second timer. Here, an example in which the time longer than the first timer is configured to the second timer will be described. The description of the operations similar to those of the operation sequence 1 will be omitted.

As illustrated in FIG. 7, in step S151, the eNB 200 transmits, to the UE 100, a steering command (Steering Command) instructing traffic steering from the E-UTRAN 10 to the WLAN 30.

The eNB 200 configures the first timer and the second timer to the UE 100. The eNB 200 may configure the first timer and the second timer to the UE 100 by the steering command. The eNB 200 may configure the first timer and the second timer to the UE 100 by signaling that is different from the steering command.

In step S152, the AS entity 131 of the UE 100 having received the steering command provides a notification (Move-traffic-to-WLAN indication) of that effect to the upper entity 132. The AS entity 131 may notify the upper entity 132 of the first timer and the second timer configured from the eNB 200 together with the notification (Move-traffic-to-WLAN indication).

In step S153, the AS entity 131 starts the first timer and the second timer. The order of steps S102 and S103 may be reversed, or may be performed at the same time.

In step S154, the AS entity 131 checks whether the traffic steering is successful. If the traffic steering is successful (step S154: YES), the AS entity 131 stops the first timer and the second timer in step S155.

If the traffic steering is not successful (step S154: NO), the AS entity 131 confirms whether the first timer has expired in step S156. If the first timer has not expired (step S156: NO), the AS entity 131 returns the process to step S154.

If the timer of the first timer has expired (step S156: YES), the AS entity 131 transmits a WLAN failure report to the eNB 200 in step S157. However, the AS entity 131 does not perform a notification (move-traffic-from-WLAN) to the upper entity 132. Even after the transmission of the WLAN failure report, the upper entity 132 continues the trial of the traffic steering.

In step S158, the AS entity 131 checks whether the traffic steering is successful. If the traffic steering is successful (step S158: YES), the AS entity 131 stops the second timer in step S159. In this case, the AS entity 131 may transmit, to the eNB 200, a notification (WLAN Successful Report) indicating the success of the traffic steering.

If the traffic steering is not successful (step S158: NO), the AS entity 131 confirms whether the second timer has expired in step S160. If the second timer has not expired (step S160: NO), the AS entity 131 returns the process to step S158.

If the timer of the second timer has expired (step S160: YES), the AS entity 131 stops (invalidates) the application of the steering command in step S161.

In step S162, the AS entity 131 performs a notification (move-traffic-from-WLAN) to the upper entity 132. The order of steps S161 and S162 may be reversed, or may be performed at the same time.

Modification 1 of First Embodiment

Figure 8:
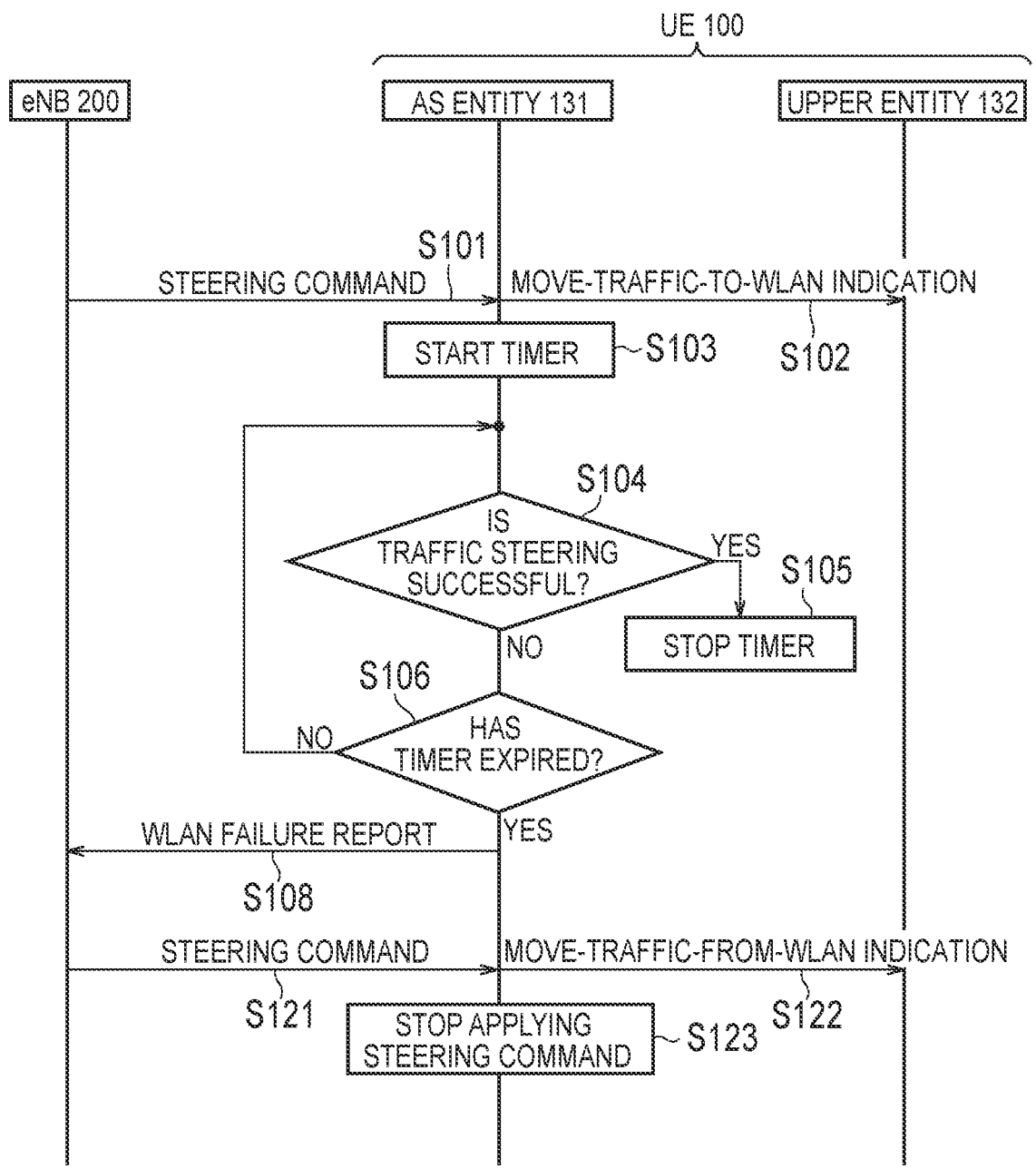
FIG. 8 is a diagram illustrating an operation sequence according to modification 1 of the first embodiment.

FIG. 8 is a diagram illustrating an operation sequence according to modification 1 of the first embodiment. FIG. 8 is a sequence partially modified from the operation sequence 1 according to the first embodiment. The description of the operations similar to those of the operation sequence 1 according to the first embodiment will be omitted.

As illustrated in FIG. 8, steps S101 to S106 and S108 are the same as those of the operation sequence 1 according to the first embodiment. However, if the timer has expired, the AS entity 131 does not perform invalidation of the steering command, for example, a notification (move-traffic-from-WLAN) to the upper entity 132. Even after the transmission of the WLAN failure report, the upper entity 132 continues the trial of the traffic steering.

In step S121, the eNB 200 transmits, to the UE 100, a steering command (steering back command) instructing the traffic steering to the E-UTRAN 10, based on the WLAN failure report.

In step S122, the AS entity 131 of the UE 100 having received the steering command provides a notification (Move-traffic-from-WLAN indication) of that effect to the upper entity 132.

In step S123, the AS entity 131 stops (invalidates) the application of the steering command. The order of steps S122 and S123 may be reversed, or may be performed at the same time.

Modification 2 of First Embodiment

In the first embodiment, the traffic steering from the E-UTRAN 10 to the WLAN 30 has mainly been described.

In this modification, the traffic steering from the WLAN 30 to the E-UTRAN 10 will be described.

In this modification, the UE 100 receives, from the E-UTRAN 10 (eNB 200), a second steering command instructing the second traffic steering from the WLAN 30 to the E-UTRAN 10. The UE 100 starts a predetermined timer configured from the eNB 200 in response to reception of the second steering command. The predetermined timer may be the same timer as the timer according to the first embodiment described above. The predetermined timer may be a timer that is different from the timer according to the first embodiment described above. In the case of the different timer, the eNB 200 may configure a predetermined timer to the UE 100 by the second steering command.

If the second traffic steering is not successful while the predetermined timer is running, the UE 100 transmits, to the eNB 200, a report (LTE failure report) indicating failure of the second traffic steering. The UE 100 can maintain the RRC connection with the eNB 200 while transmitting and receiving the traffic in the WLAN 30. The UE 100 can transmit an LTE failure report to the eNB 200 even if the second traffic steering is not successful.

The LTE failure report may include information similar to the WLAN connection status report as the cause of failure. The LTE failure report may include information specific to the LTE failure report. For example, the specific information is an identifier of a PDN connection (APN) that failed in steering to the E-UTRAN 10. The specific information may be a value such as "failure-still-in-WLAN".

Second Embodiment

In the second embodiment, differences from the first embodiment will be described below.

In the second embodiment, the UE 100 receives, from the E-UTRAN 10, an assistance parameter (RAN assistance parameter) that is different from the steering command. The RAN assistance parameter includes a parameter for the UE 100 to determine the traffic steering between the E-UTRAN 10 and the WLAN 30. The steering command is used for RCLWI, whereas the RAN assistance parameter is used for RALWI.

If the RAN assistance parameter is a priority configuration of the E-UTRAN 10, the RAN assistance parameter conflicts with the steering command instructing the traffic steering to the WLAN 30. Therefore, if the RAN assistance parameter is applied immediately after the traffic steering from the E-UTRAN 10 to the WLAN 30, the traffic steering (that is, ping-pong phenomenon) from the WLAN 30 to the E-UTRAN 10 may occur.

Therefore, in the second embodiment, the UE 100 stops applying the RAN assistance parameter (that is, stops the RALWI) while the timer is running. When the timer has expired, the UE 100 may restart applying the RAN assistance parameter (that is, restart the RALWI). As the timer according to the second embodiment, the second timer that defines the valid period of the steering command is mainly assumed. The UE 100 stops applying the RAN assistance parameter (that is, stops the RALWI) in the valid period of the steering command. In this modification, the UE 100 does not stop the second timer even if the traffic steering is successful.

Figure 9:
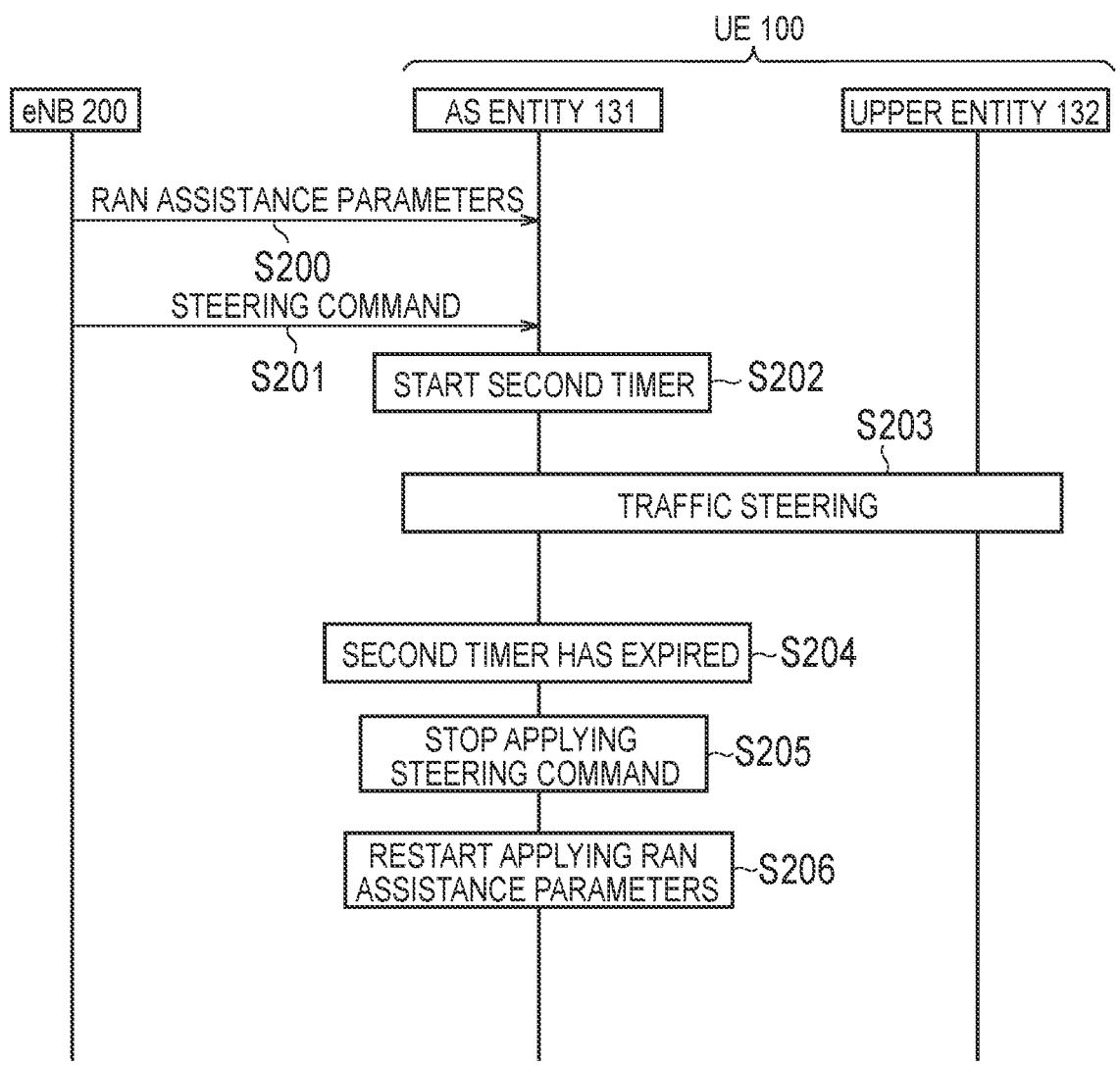
FIG. 9 is a diagram illustrating an operation sequence according to a second embodiment.

FIG. 9 is a diagram illustrating an operation sequence according to the second embodiment. A case where the traffic steering from the E-UTRAN 10 to the WLAN 30 is successful is assumed.

As illustrated in FIG. 9, in step S200, the eNB 200 transmits RAN assistance parameters to the UE 100 by broadcast RRC signaling or dedicated RRC signaling. It is assumed that the RAN assistance parameters are transmitted by dedicated RRC signaling.

The AS entity 131 of the UE 100 stores the RAN assistance parameters received from the eNB 200 and applies the RAN assistance parameters. Specifically, the AS entity 131 determines whether a RAN rule is satisfied, based on the RAN assistance parameters.

In step S201, the eNB 200 transmits, to the UE 100, a steering command instructing the traffic steering from the E-UTRAN 10 to the WLAN 30. The eNB 200 configures the second timer to the UE 100. The order of steps S200 and S201 may be performed at the same time.

In the second embodiment, the steering command has a higher priority than that of the RAN assistance parameter. If the steering command is the first method, the AS entity 131 may recognize the special RAN assistance parameter as the steering command and may store the already configured RAN assistance parameter. If the steering command is the second method, the AS entity 131 may determine that it does not follow the already configured RAN assistance parameter.

In step S202, the AS entity 131 starts the second timer in response to the reception of the steering command. The AS entity 131 starts the second timer and stops applying the RAN assistance parameter (that is, stops the RALWI). Even if the AS entity 131 stops applying the RAN assistance parameter, the AS entity 131 may store the RAN assistance parameter without discarding the RAN assistance parameter.

In step S203, the AS entity 131 and the upper entity 132 perform the traffic steering from the E-UTRAN 10 to the WLAN 30. In the second embodiment, the RCLWI (steering command) gives priority to the RALWI (RAN assistance parameter) while the second timer is running.

In step S204, the second timer expires. If the eNB 200 still wants to keep the WLAN 30 connection to the UE 100, the eNB 200 may transmit the steering command again to the UE 100 during the period in which the second timer is running (that is, the validity period of the steering command).

In steps S205 and S206, the AS entity 131 restarts applying the RAN assistance parameter (that is, restarts the RALWI). The AS entity 131 reads the stored RAN assistance parameter and reapplies the RAN assistance parameter. The AS entity 131 may receive the RAN assistance parameter transmitted by the broadcast RRC signaling and apply the received RAN assistance parameter.

In the second embodiment, while the second timer is running, the AS entity 131 may stop applying the RAN assistance parameter even when the UE 100 transitions to the RRC idle mode. In other words, the UE 100 in RRC idle mode gives priority to the RCLWI (steering command) rather than the RALWI (RAN assistance parameter) while the second timer is running.

As the timer used for the RRC idle mode, there is a timer called T350 which defines a period during which a dedicated RAN assistance parameter is applied. The UE 100 starts the T350 when transitioning to the RRC idle mode and stores the dedicated RAN assistance parameter until the T350 expires. Thus, if the T350 is running when the second timer has expired, the UE 100 may switch from the steering command to the dedicated RAN assistance parameter when the second timer has expired. If the T350 has expired, the UE 100 switches from the dedicated RAN assistance parameter to the broadcast RAN assistance parameter.

If the second timer is running when transitioning to the RRC idle mode, the UE 100 may delay the start of the T350 until the second timer expires. The UE 100 in the RRC idle mode starts the T350 when the second timer has expired.

Modification of Second Embodiment

In the second embodiment, while the second timer is running, the UE 100 in the RRC idle mode gives priority to the RCLWI (steering command) rather than the RALWI (RAN assistance parameter). However, it is also assumed that the situation of the WLAN 30 deteriorates after performing the traffic steering to the WLAN 30. The deterioration of the situation of the WLAN 30 is, for example, weak WLAN RSSI, high WLAN load, or the like. Therefore, as a result of giving priority to the RCLWI (steering command), it is not preferable that the traffic cannot be returned to the E-UTRAN 10.

Therefore, in this modification, a WLAN evaluation parameter for the UE 100 to evaluate the WLAN 30 is included in the steering command. The WLAN evaluation parameter may include at least one of the WLAN channel utilization threshold, the WLAN backhaul data rate threshold, and the WLAN signal strength threshold, which have been described above. After the traffic steering, the UE 100 in the RRC idle mode evaluates the WLAN 30 by using the WLAN evaluation parameter. If the condition of returning the traffic to the E-UTRAN 10 is satisfied due to the deterioration of the situation of the WLAN 30, the UE 100 performs the traffic steering from the WLAN 30 to the E-UTRAN 10.

When the traffic is returned to the E-UTRAN 10, if the UE 100 stores the steering command, the UE 100 may perform the traffic steering to the WLAN 30 again. Therefore, the UE 100 may discard the steering command when determining to return the traffic to the E-UTRAN 10 based on the WLAN evaluation parameter.

Third Embodiment

In the third embodiment, differences from the first embodiment and the second embodiment will be described below. The third embodiment is an embodiment for achieving appropriate coexistence of RALWI and RCLWI.

The eNB 200 according to the third embodiment transmits the RAN assistance parameter and the steering command to the UE 100. The RAN assistance parameter is a parameter for the UE 100 to determine the traffic steering between the E-UTRAN 10 and the WLAN 30. The steering command is a command instructing the traffic steering between the E-UTRAN 10 and the WLAN 30. The eNB 200 further transmits, to the UE 100, information (hereinafter referred to as "determination information") used for determining which of the RAN assistance parameter and the steering command has to be applied to the UE 100.

The UE 100 according to the third embodiment receives the RAN assistance parameter and the steering command from the eNB 200. The RAN assistance parameter is a parameter for the UE 100 to determine the traffic steering between the E-UTRAN 10 and the WLAN 30. The steering command is a command instructing the traffic steering between the E-UTRAN 10 and the WLAN 30. The UE 100 receives the determination information from the eNB 200 and applies one of the RAN assistance parameter and the steering command based on the determination information.

The determination information may be broadcast information (broadcast RRC signaling) indicating the stop of application of the RAN assistance parameter. The UE 100 stops applying the RAN assistance parameter in response to the reception of the broadcast information.

The determination information may be measurement configuration information for configuring WLAN measurement. The UE 100 stops applying the RAN assistance parameter in response to the reception of the measurement configuration information.

Figure 10:
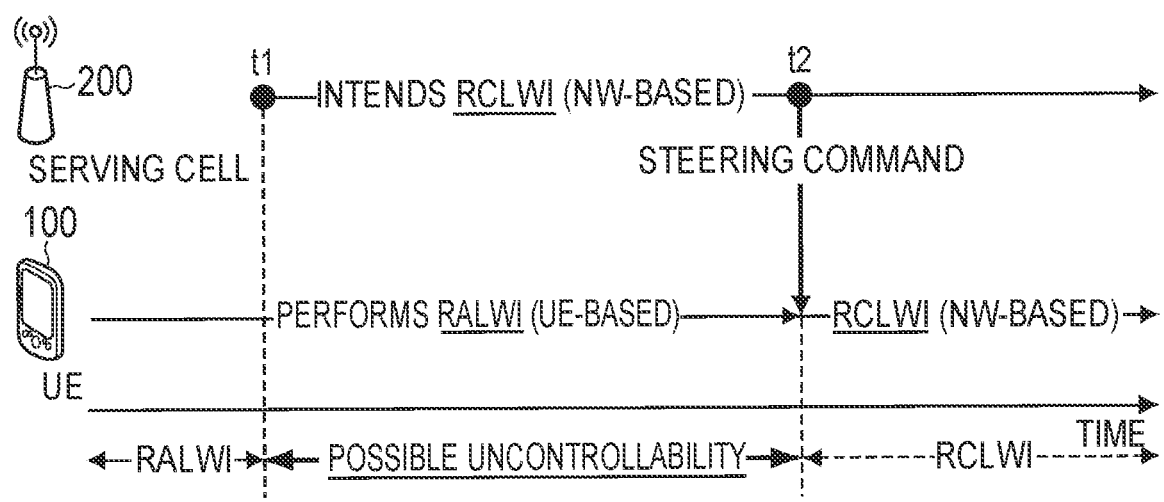
FIG. 10 is a diagram illustrating an operation according to a third embodiment.

FIG. 10 is a diagram illustrating an operation according to the third embodiment. As illustrated in FIG. 10, the eNB 200 determines to apply the RCLWI at time t1. The eNB 200 transmits the steering command to the UE 100 at time t2. The UE 100 operates according to the RALWI until the steering command is received. When the steering command is received, the UE 100 operates according to the RCLWI. Here, since the UE 100 operates according to the RALWI during the period from the time t1 to the time t2, the UE 100 can perform the traffic steering by the determination of the UE 100. Therefore, the UE 100 may perform an operation contrary to the intention of the eNB 200 to apply the RCLWI.

Therefore, the eNB 200 transmits the broadcast information indicating the stop of application of the RAN assistance parameter at the time t1. Alternatively, the eNB 200 transmits the measurement configuration information for configuring the WLAN measurement to the UE 100 at time t1. The UE 100 stops operating according to the RALWI in response to the reception of the broadcast information or the measurement configuration information. That is, the UE 100 stops applying the RAN assistance parameter. Therefore, it is possible to prevent the UE 100 from performing the traffic steering by the RALWI during the period from the time t1 to the time t2.

In the third embodiment, the determination information may be information (hereinafter, "operation configuration information") for configuring an operation after the UE 100 transitions to the RRC idle mode. The eNB 200 transmits the operation configuration information to the UE 100 by dedicated RRC signaling or broadcast RRC signaling.

After the UE 100 transitions to the RRC idle mode, the UE 100 performs the operation configured by the operation configuration information. Specifically, after the UE 100 performs the traffic steering to the WLAN 30, the UE 100 performs the operation configured by the operation configuration information when transitioning to the RRC idle mode. The UE 100 may start the operation configured by the operation configuration information when the above-described timer (for example, T350) has expired after transitioning to the RRC idle mode.

Examples of the RRC idle mode operation configured by the operation configuration information include the following first to sixth operations.

The first operation is an operation of performing the RALWI according to the broadcast RAN assistance parameter.

The second operation is an operation of transferring the traffic (available traffic) to the E-UTRAN 10.

The third operation is an operation of holding the traffic to the WLAN 30 until the WLAN connection failure (connection failure) occurs.

The fourth operation is an operation of fixing the traffic to the WLAN 30 until the WLAN measurement event is triggered. The WLAN measurement event can be configured by the WLAN measurement configuration. The eNB 200 may configure an event to be used for determination to the UE 100. The eNB 200 may designate how the UE 100 behaves in association with each event (for example, returning the traffic to the E-UTRAN 10, performing the RRC connection establishment, waiting for the instruction of the eNB 200, and the like). When the event configured from the eNB 200 occurs, the UE 100 performs an operation associated with the event.

The fifth operation is an operation of performing the RRC connection establishment. The UE 100 may wait for the instruction of the eNB 200 (for example, the steering command) after establishing the RRC connection with the eNB 200.

The sixth operation is an operation in which the UE 100 freely decides its own operation.

Other Embodiments

In the embodiment, the second method of the steering command has not been described in detail. However, a new steering command may be configured as follows. FIG. 11 is a diagram illustrating a steering command according to another embodiment. As illustrated in FIG. 11, the RAN assistance parameter is included in WLAN offload configuration information (WLAN-OffloadConfig-r12) transmitted from the eNB 200 to the UE 100. The steering command (steering Command-r13) also constitutes part of the WLAN offload configuration information. The steering command is configured to either to WLAN indicating the traffic steering to the WLAN 30 or to LTE indicating the traffic steering to the E-UTRAN 10 (LTE). A specific condition (woRAP) is provided to the steering command. The specific condition is a condition that it is permitted to include the steering command in the WLAN offload configuration information only when the dedicated RAN assistance parameters are not provided in the WLAN offload configuration information. In other words, if the dedicated RAN assistance parameter is provided in the WLAN offload configuration information, no steering command is provided in the WLAN offload configuration information. By providing such a condition, it is possible to prevent both the dedicated RAN assistance parameter and the steering command from being provided in the WLAN offload configuration information, thereby preventing an unexpected error from occurring.

In FIG. 11, as described in the modification of the second embodiment, the WLAN evaluation parameter for the UE 100 to evaluate the WLAN 30 may be provided to the UE 100 together with the steering command. In this case, the inclusion in the WLAN offload configuration information together with the steering command is permitted in the dedicated RAN assistance parameter used as the WLAN evaluation parameter. In other words, if the dedicated RAN assistance parameters other than the WLAN evaluation parameter according to the modification of the second embodiment are provided in the WLAN offload configuration information, the steering command is not provided in the WLAN offload configuration information.

In the embodiment, the threshold of the timer may be infinite. In other words, the state can be separated by the case where the traffic steering is performed by the steering command (RCLWI) and the case where the traffic steering is performed by the UE-based determination (RALWI). In this case, for example, if the UE transitions to the idle mode, it is possible to control (or predict), from the network side, whether to apply the UE-base mechanism (RALWI) operation.

The first to third embodiments may be separately and independently performed. The first to third embodiments may be implemented by combining two or more embodiments.

In the embodiment, the LTE system is exemplified as the WWAN system, but WWAN systems other than the LTE system may be used.

[Additional note 1]

(1. Introduction)

The outline of the steering command was agreed as follows.

Agreements

For interworking

1 As in Rel-12 higher layers determine which traffic is offloadable.

4.3.23a Access network selection and traffic steering based on RAN-Controlled WLAN interworking

[ . . . ] When E-UTRAN sends an "offload" command to the UE, the UE passes an indication to the upper layers indicating that traffic steering to/from WLAN is needed. [ . . . ]

On the other hand, we reached the agreements on the indication from the UE to inform the serving cell of the connection failure towards the WLAN which was triggered by the steering command Agreements 1: In RCLWI, an indication from UE to eNB is defined and triggered under the following scenarios:

a) When UE fails to connect to any AP in the eNB provided WLAN mobility set, on receiving eNB command to start RCLWI operation b) When UE fails to connect to any AP in the eNB provided WLAN mobility set, on receiving eNB command to perform inter-WLAN mobility set mobility procedure.

2: No success indication is introduced for RCLWI.

In this additional note, the further details of UE behavior in the failure case are discussed.

(2. Discussion)

(2.1. UE behavior in traffic steering failure)

According to the current agreements, the UE should try to connect to an AP within the mobility set when it receives the steering command from the serving cell. The UE should also send an indication, i.e., a failure indication, to the serving cell if it cannot connect to any APs, while it does not need to send the indication when the WLAN connection is successfully established. Although it's stated in the current running CR that "The criteria to determine WLAN connection failure is left for UE implementation", it still needs further discussions when/how the UE triggers the failure indication, in order to achieve the improved network controllability and the improved overall UE throughput which are the main objectives in this WI.

Observation 1: It still needs further clarifications when/how to trigger the failure indication.

From the AS-layer point of view, two mechanisms may be considered for when the UE determines whether the traffic steering initiated by the steering command has failed.

Mechanism 1: An AS-specific timer expiry

If the new timer could be defined, it may start when the UE receives the steering command from the serving cell and stop when the corresponding traffic steering is successfully completed. If the timer expires while the traffic steering is not completed, the UE determines it has failed to connect to WLAN in the mobility set and triggers the failure indication to the serving cell. It's similar in concept to the T360 timer in the current running CR (or T351) and the corresponding agreed way forward, for LTE-WLAN Aggregation (LWA). It may be also necessary for the higher layer to inform the AS-layer if the traffic steering is successfully completed in order to stop this timer, similar to Mechanism 2 below.

Mechanism 2: A failure notification from higher layer addition to the generic failure indication from the UE to the serving cell, the higher layer should inform the AS-layer as to reason for the traffic steering failure since the higher layer is ultimately responsible for traffic steering. In turn, the UE should inform the eNB in the WLAN-Status-r13 as part of the failure indication one of the possible cause values e.g., failureRadioLink, failureInternal, failureOther, failureTimeout or failureConnReject.

With Mechanism 1, the expected result for the steering command would be known in a timely manner from the serving cell's perspective; otherwise the serving cell may not know how long to wait before the WLAN connection fails, which may result in e.g., the delay of appropriate actions to the UE. In addition from the UE point of view, when Mechanism 1 is not supported, the UE may continue to try connecting to WLAN even if the radio condition is no longer better than threshold, i.e., the steering command is still valid even while Event W1 or W2 for the measurement reporting is not fulfilled, which is one of the different behaviours compared to Rel-12 RAN-assisted LTE-WLAN Interworking (RALWI). Considering the UE moves around, it would cause worse user experiences. On the other hand, if Mechanism 2 is not available then the UE could not send the failure indication to the serving cell, although a large part of Mechanism 2 may be up to UE implementation. So, these mechanisms seem to be essential to be supported/assumed in RAN-controlled LTE-WLAN Interworking (RCLWI).

Proposal 1: An AS-specific timer should be introduced to determine the validity of the steering command and to trigger the failure indication.

If Proposal 1 is agreeable, RAN2 should discuss whether the AS-layer should be notified by the higher layer the traffic steering is successfully completed in order to stop the AS-specific timer.

Observation 2: The AS-layer may be notified by the higher layer whether the traffic steering corresponding to the steering command is failed, in order to send the failure indication.

Proposal 2: RAN2 should discuss whether the cause value (i.e., the WLAN status except for successfulAssociation) in the failure indication should be provided also for Interworking Enhancements.

(2.2. Implicit cancel of steering command upon failure indication)

On the other hand, it also needs clarifications how the UE behaves after sending the failure indication, i.e., the traffic steering is failed. It could be considered there are two possible assumptions as follows;

Assumption 1: The UE needs to wait for the steering "back" command from the serving cell. The UE may or may not continue to (re-)try connecting to WLAN in the duration (which may be up to the higher layer).

Assumption 2: The UE may cancel the steering command implicitly.

Assumption 1 seems a baseline procedure, since it's up to the serving cell to decide whether to send the send the steering "back" command (or to de-configure the traffic steering). It seems to imply the steering command originally received is still valid, so the UE should retry acquiring the WLAN again and again even if the WLAN cannot be connected after all for some reason (i.e., the failure indication already is declared), unless the serving cell de-configures the traffic steering. Considering the UE battery consumption to re-acquire a WLAN, such an useless acquisitions should be prevented. In addition, it's still unclear whether the UE should send the failure indication again when the retry also fails. With Assumption 2, when the failure indication is sent, both the UE and the serving cell could implicitly know that the steering command is no longer valid, and the UE therefore may stop the acquiring the WLAN. Since the WLAN connection is already failed once and the "successful" indication cannot be sent even if the WLAN connection is recovered as agreed, Assumption 2 seems more reasonable from a practical perspective. Of course, if the serving cell still prefers the traffic steering to WLAN, it could resend the steering command anytime, e.g, taking into account the cause value (WLAN status) within the failure indication.

Proposal 3: Confirm that the steering command is no longer valid after the UE sends the failure indication.

If Proposal 3 is agreeable, RAN2 may need to ask SA2 if the higher layer needs to be informed the steering command is no longer valid, i.e., whether the traffic steering "from" WLAN should be indicated.

(3. Conclusion)

In this additional note, the further details of UE behaviors for the WLAN connection failure are explained. The possible solutions with the AS-specific timer and the higher layer interactions to determine the connection failure in the AS-layer are provided. The implicit cancel of the steering command is identified to avoid the signaling overhead upon the connection failure.

[Additional note 2]

(1. Introduction)

In Rel-13, the enhancements to LTE-WLAN Interworking aim to improve overall user throughput by means of the network-controlled WLAN offloading. One of the guidelines of this WID is to develop solutions that will co-exist with other 3GPP/WLAN interworking solutions. Furthermore, SA2 has also informed RAN2 of the agreed solution for "Co-existence between LTE-WLAN Radio Level Integration and Interworking Enhancement and other WLAN offloading solutions (e.g. ANDSF)", which resolves the issue with co-existence issue in the higher layer.

In this additional note, the issues with co-existence with existing solutions are discussed from the perspective of the UE's AS-layer.

(2. Discussion)

It is assumed that UE's supporting WLAN interworking may be required to support both the Rel-12 RAN-assisted LTE-WLAN Interworking (RALWI) and the Rel-13 RAN-controlled LTE-WLAN Interworking (RCLWI). Based on our understanding the new mechanism (RCLWI) is based on the outcome of the Rel-12 study, i.e., Solution 3 which describes "For UEs in IDLE mode and CELL_FACH, CELL_PCH and URA_PCH states the solution is similar to solution 1 or 2". Therefore, the Rel-13 solution may reuse or extend the mechanism already specified for RALWI in Rel-12. In particular, the UE's handling of SIB17 in Rel-13 in the AS-layer should be further discussed, as the existing SIB17 from Rel-12 is necessary to support ANDSF and for traffic steering in IDLE UEs.

Proposal 1: RAN2 should discuss the UE's AS-layer behaviour in Rel-13 in the presence of SIB17 required to support ANDSF and IDLE UEs in Rel-12.

(2.1. Connected mode UE behavior)

In Rel-12, RALWI adopted the UE-based mechanism assisted by the NW. On the other hand, Rel-13 RCLWI would support the full NW-controlled traffic steering. So, if SIB17 is broadcasted as suggested in Proposal 1, the UE may arbitrarily perform the traffic steering according to the RAN rule (RALWI) even when the serving cell intends to control the UE with RCLWI, i.e., the steering command. For example, if the UE's AS-layer behavior is not well-defined, there may be situations wherein the serving cell wanted the UE to keep its traffic on LTE but the UE may have already decided to move traffic to WLAN. It's no longer full-controllable from the serving cell's perspective. So, it's preferable that the use of RALWI and RCLWI can be controlled independently even if they share the same mechanism (i.e., the existence of SIB17).

Observation 1: If the UE's AS-layer behavior for Rel-13 is not properly specified there may be a mismatch between the serving cell's intention and the UE's behavior for traffic steering.

Figure 12:
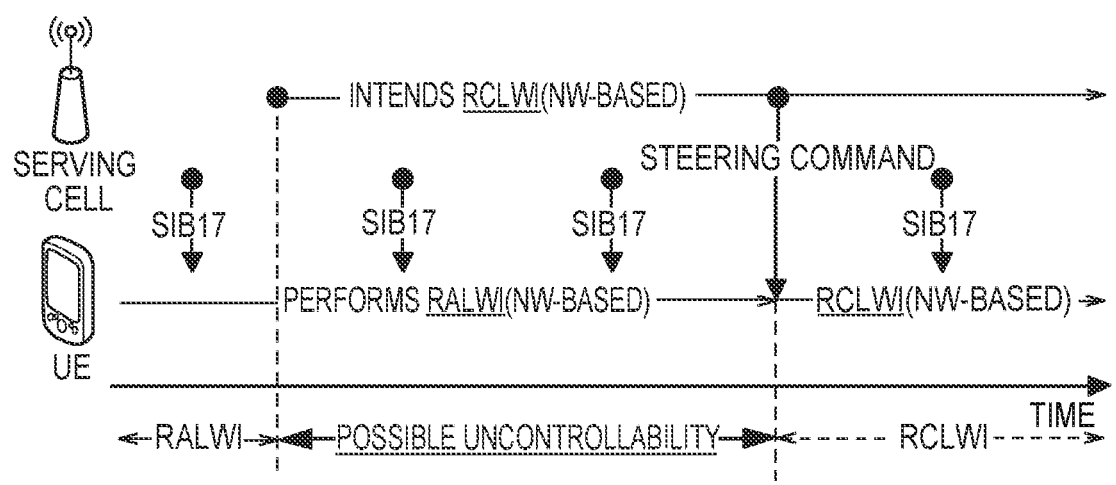
FIG. 12 is a diagram illustrating uncontrollability that can be caused by different mechanisms according to supplementary node.

The issue described in Observation 1 is one of the topics in an email discussion and it was discussed whether the steering command should be defined with infinite thresholds of the existing RAN assistance parameter or as a new message, i.e., "Proposal 1" or "Proposal 2" in. Although both approaches would work to support the required steering command, it may be worth further consideration on their applicability to unambiguously select RALWI and RCLWI without excessive UE complexity. With the use of the infinite thresholds, i.e., "Proposal 1" in, the serving cell may activate RCLWI as soon as the thresholds are configured with the infinite values and this will serve to stop any existing RALWI. However, even if the infinite thresholds approach is adopted, RALWI may still be performed up to the time when the UE receives the steering command (when the UE receives the configuration with infinite thresholds), as illustrated in FIG. 12. FIG. 12 illustrates possible uncontrollability caused by different mechanisms.

Observation 2: The UE-based traffic steering (RALWI) may continue until it receives the infinite thresholds, e.g., until SIB17 is updated with infinite thresholds.

Proposal 2: RAN2 should discuss whether it is necessary to solve the potential uncontrollability condition that arises due to the presence of SIB17 as part of the NW-based mechanism.

If Proposal 2 is agreeable, four alternatives may be considered as follows.

Alternative 1: Pre-steering command stops RALWI.

It may be possible, especially with the infinite thresholds approach, that the serving cell sends the steering command when it intends to use RCLWI, regardless of where the traffic was actually steered.

Alternative 2: SIB indicates to stop RALWI.

SIB may be used to indicate whether RALWI is allowable. Rel-13 UEs should always prioritize RCLWI over RALWI whenever RALWI is prohibited, even if SIB17 or the dedicated RAN assistance parameter is provided.

Alternative 3: WLAN measurement object stops RALWI.

If the serving cell configures the UE with at least one WLAN measurement object captured in, the UE will assume the serving cell intends to use RCLWI. Thus, the UE should stop performing RALWI whenever a WLAN measurement object is configured.

Alternative 4: UE in CONNECTED stops RALWI

The UE does not follow RALWI with the broadcasted RAN assistance parameter once it transitions to CONNECTED. In other words, a Rel-13 UE in CONNECTED will always ignore SIB17.

Although all alternatives can be supported with simple enhancements, Alternative 1 or Alternative 3 would be beneficial from the per-UE controllability point of view, while Alternative 2 or Alternative 4 would be beneficial by avoiding NW complexity. Between Alternative 1 and Alternative 3, Alternative 1 by itself may require additional enhancement to work correctly while the measurement configuration required with RCLWI in Alternative 3 implicitly stops the RALWI process. And between Alternative 2 and Alternative 4, Alternative 2 requires an explicit indication while Alternative 4, which assumes RALWI and RCLWI do not co-exist for UEs in CONNECTED, does not require any indication. From the perspective of signaling overhead and NW complexity, one of the implicit mechanisms is preferable. Considering LTE-WLAN Aggregation (LWA) is also performed under UEs in CONNECTED and the UE is configured with WLAN measurements to add/modify/release the resources provided by WLAN, only Alternative 3 or Alternative 4 should be considered for the NW-based mechanism.

Proposal 3: RAN2 should decide whether the UE-based traffic steering (RALWI) should be allowed when the UE is configured with WLAN measurement objects or in CONNECTED, and whether Alternative 3 or Alternative 4 should be adopted for the NW-based solution (RCLWI).

Assuming the above requirements are clarified, it is also necessary to discuss whether the serving cell should know the initial condition of steered traffic should be when the serving cell intends to perform either RCLWI or LWA. For example, when the serving cell configures the UE with LWA Configuration but some types of the UE's traffic are already steered to WLAN, the improvement of user throughput may be limited or some errors in the configuration may occur. One of the simple/safe ways could be that the UE moves all traffic to LTE when it's configured with WLAN measurement objects, but it may cause some negative impacts, such as overloading in LTE or ping-pong by the steering command. Another possibility would be for the UE to inform the serving cell of its traffic status, which may include various possibilities such as cause values within the WLAN modem status report, availability of offloadable traffic and so on. In addition, when the UE does not have the freedom of WLAN modem for RCLWI or LWA, e.g., in case that it already connected to a user-preferred WLAN, it's preferable the UE should not be required to send any WLAN measurement report. In that sense, the serving cell would know the traffic status of the UE in advance of the measurement configuration.

Proposal 4: RAN2 should discuss whether the serving cell should be aware if any of UE's traffic is already active on an operator WLAN.

Proposal 5: RAN2 should discuss whether the initial condition of traffic should be given upon/before WLAN measurement objects are configured.

If Proposal 4 is desirable, RAN 2 should also consider whether the information regarding existing traffic on WLAN should be provided to the serving cell before or after the WLAN measurement configuration.

Proposal 6: RAN2 should also decide if the information on the existing traffic on WLAN needs to be provided to the serving cell before or after the WLAN measurement configuration.

(2.2. IDLE mode UE behavior)

Figure 13:
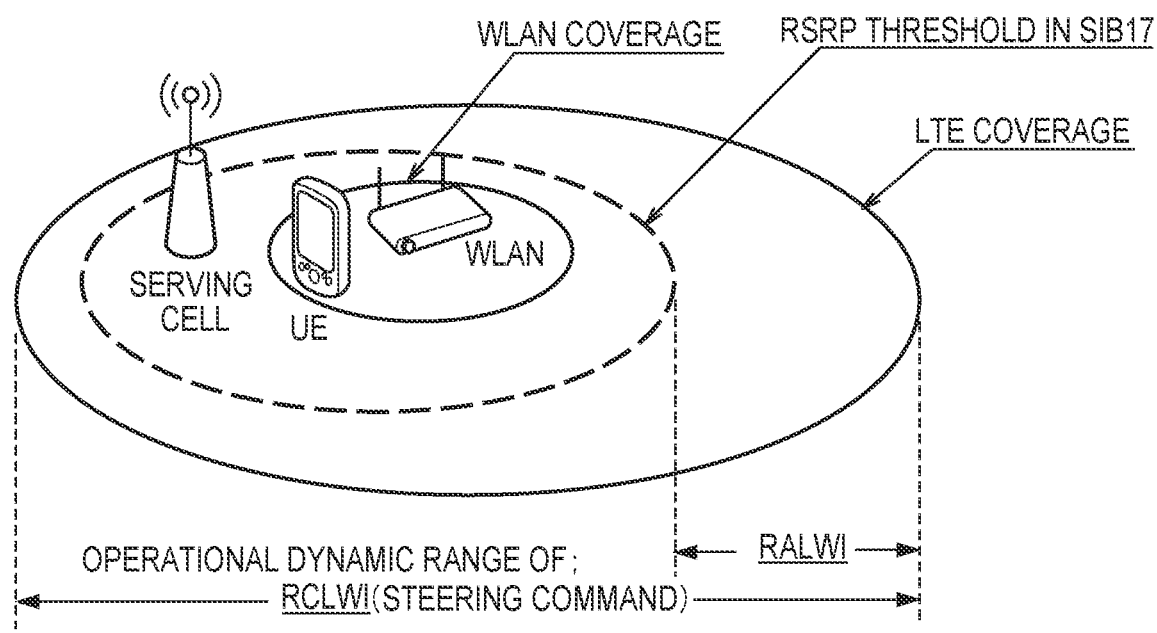
FIG. 13 is a diagram illustrating different dynamic ranges according to supplementary node.

The UE behavior in IDLE was discussed in the email discussion, and it provides a good summary and evaluations of the four solutions already proposed, i.e., "Proposal A~D" and "E" in. One of the main discussions was whether or not to support T350 after Rel-13 UE transitions to IDLE, i.e., "Proposal A/B" or "C/D". If any timer is not supported, it may also cause frequent ping-ponging which results in negative impacts on UE battery consumption, e.g., due to the frequent transfer of PDN connection as pointed out in. For example, for the UE located near the eNB, the UE's traffic will likely remain in LTE under Rel-12 RALWI due to the stronger RSRP assuming the serving cell is not interested in steering traffic of all UEs to WLAN. However, for Rel-13, the traffic for such a UE may be steered to WLAN with the steering command since the steering command may be easily directly towards specific UEs without affecting other un-targeted UEs, as illustrated in FIG. 13. FIG. 13 illustrates different dynamic ranges. When the UE transitions to IDLE and remains connected to WLAN, the UE may move its traffic back to LTE immediately, assuming the UE follows the RAN rule (RALWI) in IDLE, if Proposal 1 is agreeable. So, the timer should be used to avoid such ping-ponging. In addition, it should be discussed whether to reuse T350 starts upon RRC Connection Release, or to introduce a new timer starts upon reception of the steering command.

Proposal 7: A validity timer for the steering command after the UE transitions to idle mode should be introduced, e.g., T350.

If Proposal 7 is agreeable, another issue is how the UE behaves after the timer expires. Four options are potential candidates according to the email discussion;

Option 1: After the timer expiry, the UE follows RALWI with SIB17. Option 2: Upon the timer expiry, the UE moves its traffic back to LTE, if active traffic are present.

Option 3: The UE keeps its traffic in WLAN, unless the WLAN connection failure is declared.

Option 4: The UE keeps its traffic in WLAN, unless the WLAN measurement event is triggered.

Option 1 may be the baseline since it only reuses the existing mechanism, i.e., no standardization effort is foreseen.

Option 2 offers a simpler way to give a default condition from the NW point of view, i.e., it's predictable since the traffic in IDLE mode always stay in LTE. However, it's unclear how the UE decides whether to follow SIB17 (as Rel-12 RALWI) or to move traffic back to LTE regardless of SIB17 (as a new behaviour in Rel-13).

Option 3 could be interpreted that the steering command, which received in advance of transition to IDLE, is expected to be valid forever as long as the UE can maintain the connection to WLAN, wherein the criteria may be reused one for the WLAN status reporting as agreed that "The exact criteria to determine "WLAN connection failure" towards a WLAN are not specified" So, this option is actually left up to UE implementation. Also, as the same to Option 2, it's unclear which behavior the IDLE UE should follow, Rel-12 RALWI or Rel-13 mechanism.

Option 4 may potentially provide the same behavior in CONNECTED, as pointed out in. However, it's not crystal clear whether the UE would know what to do from the event trigger information, since currently the events just triggers the WLAN measurement reporting, i.e., it's up to NW implementations which link the UE moves its traffic to. Also, similar to Options 2 and 3, it's unclear which behavior the IDLE UE should follow, Rel-12 RALWI or Rel-13 mechanism.

Although Option 1 is our preference as stated in the email discussion, considering the Rel-13 Interworking Enhancement is expected to provide better NW controllability, it may be necessary to at least allow the serving cell to determine if the UE should follow the RALWI with SIB17 e.g., with an indication from the serving cell. Alternatively, the new mechanisms for IDLE UEs described in Options 2-4 provide a more deterministic UE behavior from the network's perspective and maybe considered more suitable for Rel-13.

Proposal 8: RAN2 should decide if it is necessary to adopt any new behavior for IDLE UEs or if it is sufficient for IDLE UEs to follow the existing RAN rule, i.e, the same behavior as in Rel-12.

(3. Conclusion)

In this additional note, the possible issues in UEs in idle and connected mode are identified, from the perspective of AS-layer for co-existence with the existing mechanism. The solutions are provided and evaluated, taking into account Rel-13 Interworking Enhancements and also WLAN Aggregation.

[Additional note 3]

(1. Introduction)

There are some companies who are in favor of reporting WLAN status upon the change of the status. This remaining issue is the subject of this contribution for the completion of this WI.

(2. Discussion)

According to the endorsed 36.331 CR, UE shall perform WLAN Connection Status Reporting procedure when WLAN connection is failed. For the next behavior of the eNB, UE set an appropriate reason of the failure (i.e., failureRadioLink, failureInternal, failureConnReject, failureOther or failureTimeout).

This behavior is aligned with an agreement: 2: The report indicates (at least) a cause value (values to be defined, e.g: "UE problem" or a "WLAN problem") FFS when the report is triggered (may depend of the specific cause values)

However, the FFS "when the report is triggered (may depend of the specific cause values)" was not discussed enough since the status is commonly reported regardless of the cause of the failure in the current CR.

Observation 1: RAN2 has not discussed yet the FFS "when the report is triggered (may depend of the specific cause values)".

Depending on the cause value of the failure, the recovery may be predictable by the eNB if the failure cause is on the network side while it may be unpredictable if the failure is resides within the UE. For example, if the UE sends WLAN Connection Status Reporting with "failureInternal", the eNB may assume WLAN connection is failed due to "connection to another WLAN based on user preferences" or "user turning off WLAN connection" [5]. Unless another means for informing the internal UE problems related to WLAN is recovered, the UE may no longer be reconfigured with the appropriate LWA configuration (lwa-WT-Counter and wlan-MobilitySet) even if WLAN becomes available (e.g. the UE disconnect with user preferred WiFi).

Observation 2: eNB may miss the opportunity to reconfigure the UE with appropriate LWA configuration using the current trigger for WLAN Connection Status Reporting.

Furthermore, if the failure cause is unpredictable the eNB may even choose to release the UE's LWA configuration, regardless of whether the failure is temporary or not. However, release the LWA configuration may not be desirable since there would be no mechanism for the eNB to know when the problem on the UE side has been resolved (e.g., the problem may just be that the user has turned off the UE's WLAN radio). Therefore, without additional feedback from the UE, it is difficult for the eNB to know when to reconfigure the UE with LWA once again, other than try and try again. To resolve this uncertainly, we considered 3 options that would be beneficial to the eNB:

Option 1: The UE should have the option to send a WLAN Connection Status report with "successfulAssociation" after the failure is already reported. The report of "successfulAssociation" can only be sent if the T360 timer is still running.

Option 2: The UE should have the option to send a WLAN Connection Status report with "successfulAssociation" after the failure is already reported. The report of "successfulAssociation" can be sent as long as LWA is still configured, regardless of whether the T360 timer is still running.

Option 3: The UE should have the option to send a WLAN Connection Status report with a new cause value "recovery" after the failure is already reported. The report of "recovery" can be sent as long as LWA is still configured, regardless of whether the T360 timer is still running.

With Option 1, the UE would be allowed to send a "successfulAssociation" status report to inform the eNB that the failure condition on the UE side has been resolved (e.g., the user has turned the UE's WLAN radio back on). In order for the UE to provide this status report, the T360 timer should not be stopped after the UE reports the failure; otherwise it would be necessary for the eNB to configure the T360 timer again as soon as the reported failure is received. It should also be discussed if the UE should only be allowed to send "successfulAssociation" and not any other failure cause values after the initial failure is reported or if it depends on which failure cause value is reported.

With Option 2, the UE would also be allowed to send "successfulAssociation" after the failure is reported but the UE would be allowed to send "successfulAssociation" even after T360 timer expiry.

With Option 3 is similar to Option 2, but instead of sending the "successfulAssociation" a new cause value "recovery" defined under a new recovery procedure.

In comparison, Option 1 would likely have the least impact to the existing mechanism for status reporting and to the specification. However, it also does not provide sufficient opportunity for the UE to provide status report of successful association after the UE's internal issue has been resolved since the values of lwa-AssociationTimer goes up to at most 240 sec (4 min). It's certainly not unlikely for the user to turn the WLAN radio back on after 4 min. If Option 1 is adopted, it may be necessary for the eNB to reconfigure the UE with a new timer as long as the LWA for this UE is still desirable.

If Option 2 is adopted, the UE would have the flexibility to provide the successful association indication as long as LWA is still configured. This reduces the need for the eNB to reconfigure the UE with a new timer just to check if the UE's WLAN issue has been resolved. The disadvantage of Option 2 is that "successfulAssociation" is now used for multiple scenarios, e.g., for both the case when the association with WLAN is successful (within the T360 timer) and for the case when the failure condition on the UE side is resolved.

As mentioned above, Option 3 is essentially the same as Option 2, but Option 3 uses a new cause value "recovery" to indicate to the eNB that the failure within the UE is resolved. With Option 3, use of the recovery procedure can be optionally configured to the UE. Therefore, operators may configure the use of "successfulAssociation" separately from the optional "recovery" mechanism. In particular, the existing procedure for reporting "successfulAssociation" will remain unchanged.

Based on the pros and cons above, we prefer the adoption of Option 3 as it more adequately resolve the failure issue caused by the UE while retaining the existing functionality for "successfulAssociation".

Proposal 1: UE should have the option to send a WLAN Connection Status report with a new cause value "recovery" after the failure is already reported as long as LWA is still configured.

Assuming Proposal 1 is agreeable, RAN2 should also consider whether the "recovery" mechanism should be applicable to all or only specific cause values within failure reports.

As mentioned above in an example, the case of "failureInternal" is strictly based on UE implementation, so the "recovery" mechanism should at least be applicable to this type of failure. For "failureRadioLink", it is assumed that WLAN signal is temporally lost by the UE. The eNB may know the recovery from failure status via either "feedback from WT via Xw interface" or "WLAN measurement report". Even without any feedback, eNB may retry LWA operation since the eNB may infer from this failure report that UE may recover soon. However, recovery report from the UE via the air interface is still faster and more accurate. For "failureConnReject", the problem exists only on network side so it isn't necessary for the recovery mechanism to be applicable for this type of failure. Since "failureOther" may be considered as the default cause value, likely when the higher-layer doesn't inform the AS-layer of the reason for failure, it isn't clear that there is a clear advantage for triggering the recovery mechanism for this type of failure.

Through the consideration above, RAN2 should agree the option that WLAN Status Reporting with "recovery" is triggered upon recovery from failure due to UE internal problems or radio link problem.

Proposal 2: RAN2 should agree the option that WLAN Status Reporting with "recovery" is triggered upon recovery from "failureInternal" or "failureRadioLink".

(3. Conclusion)

The remaining issue about WLAN Status Reporting is discussed in this additional note.

[Additional note 4]

Annex (TP for 36.331 based on R2-157095)

5.6.X.3.2 Initiation

The UE in RRC_CONNECTED configured for LTE-WLAN Aggregation initiates the WLAN status reporting procedure when it connects successfully to a WLAN or its connection to the WLAN fails.

5.6.X.3.3 Actions related to transmission of WLANConnectionStatusReport message

The UE shall set the contents of the WLANConnectionStatusReport message as follows:

1> set wlan-status to status in VarWLAN-Status;
1> if wlan-status is different than successfulAssociation:
2> set wlan-Identifiers to wlan-IdentifiersAssociated in VarWLAN-MobilityConfig if exists;
1> submit the WLANConnectionStatusReport message to lower layers for transmission, upon which the procedure ends;

5.6.X.4 T360 Expiry (WLAN Connection Timeout)

The UE shall:

1> if T360 expires:
2> set the field associated in VarWLAN-MobilityConfig to false; set the field status in VarWLAN-Status to failureTimeout;
2> perform WLAN Connection Status Reporting procedure in Section 5.6.X.3;

5.6.X.5 WLAN Status Monitoring

The UE shall:

1> if WLAN connection is successful:
2> set the status in VarWLAN-Status to successfulAssociation;
2> set the wlan-IdentifiersAssociated in VarWLAN-Status to the one belonging to the successfully connected WLAN;

2> if timer T360 is running:
   3> stop timer T360;
   3> perform WLAN Connection Status Reporting procedure in Section 5.6.X.3;
1> if WLAN connection fails:
2> if the failure is due to WLAN radio link issues:
   3> set the status in VarWLAN-Status to failureRadioLink;
2> if the failure is due to internal UE problems related to WLAN (e.g. connection to another WLAN based on user preferences or user turning off WLAN connection):
   3> set the status in VarWLAN-Status to failureInternal;
2> if the failure is due to connection rejection from WLAN:
   3> set the status in VarWLAN-Status to failureConnReject;
2> else:
   3> set the status in VarWLAN-Status to failureOther;
2> perform WLAN Connection Status Reporting procedure in Section 5.6.X.3;
2> if the WLAN connection failure is due to failureRadioLink or failureInternal;
   3> if configured to perform WLAN Status Recovery Monitoring procedure:
      4> perform WLAN Status Recovery Monitoring procedure in Section 5.6.X.7; 5.6.X.7 WLAN Status Recovery Monitoring The UE shall:
1> if the WLAN radio link issues has recovered;
2> set the status in VarWLAN-Status to recovery;
1> if the internal UE problems is related to WLAN (e.g. connection to another WLAN based on user preferences or user turning off WLAN connection) are recovered:
2> set the status in VarWLAN-Status to recovery;
1> perform WLAN Connection Status Reporting procedure in Section 5.6.X.3;

FIG. 14 illustrates LWA-Configuration. The IE LWA-Configuration is used to setup/modify/release LTE-WLAN Aggregation.

Table 1 shows IEs in FIG. 14.

TABLE 1

LWA-Configuration field descriptions lwa-AssociationTimer

Indicates the amount of maximum time for the UE to connect to WLAN to
enable LWA. The UE shall report success if it can connect to WLAN until
timer expiration and report failure otherwise after timer expiration as
specified in WLANConnectionStatusReport message. Value s10
corresponds to 10 seconds, s30 corresponds to 30 seconds and so on.

lwa-WT-Counter

Counter used to derive the authentication key with WLAN.

wlan-ToAddList

Includes the list of WLAN identifiers to be added to the WLAN
Mobility Set.

wlan-ToReleaseList

Includes the list of WLAN identifiers to be removed from the WLAN
the Mobility Set recovery-Report The field is used to indicate whether the UE is configured to perform
WLAN Status Recovery Monitoring procedure.

FIG. 15 illustrates WLAN-Status. The IE WLAN-Status indicates the current status of WLAN connection for LWA. The values are set as described in Section 5.6.X.3 and 5.6.X.5.

The invention claimed is:

1. A radio terminal comprising:
a controller configured to perform traffic steering for transferring traffic between the radio terminal and a core network from a Wireless Wide Area Network (WWAN) to a Wireless Local Area Network (WLAN), wherein
the controller comprises an Access Stratum (AS) entity configured to perform communication with a base station of the WWAN, and a Non-Access Stratum (NAS) entity positioned at a higher layer than the AS entity, and
the AS entity is configured to perform:
   a first process of receiving, from the base station, configuration information including a steering command instructing the traffic steering;
   a second process of providing, to the NAS entity, a first notification indicating that traffic has to be transferred to the WLAN, in response to reception of the steering command;
   a third process of transmitting, to the base station, a report indicating that connection to the WLAN has failed, in response to a failure in the connection to the WLAN, after receiving the steering command; and
   a fourth process of releasing the configuration information while providing, to the NAS entity, a second notification indicating that traffic has to be returned from the WLAN, in response to the failure in the connection to the WLAN, wherein
the radio terminal is in a radio resource control (RRC) connected state and is configured with a WWAN-WLAN aggregation from the base station of the WWAN,
the radio terminal is configured to be able to use a resume procedure, and
the controller is configured to
   when a WLAN communication is resumed from a state where the WLAN communication is unavailable to a state where the WLAN communication is available, transmit WLAN connection status report including resumption of WLAN communication as information element, to the base station of the WWAN.

2. A method performed at a radio terminal that performs traffic steering for transferring traffic between the radio terminal and a core network from a Wireless Wide Area Network (WWAN) to a Wireless Local Area Network (WLAN), comprising:
in an Access Stratum (AS) entity that performs communication with a base station of the WWAN,
   receiving, from the base station, configuration information including a steering command instructing the traffic steering;
   providing, to a Non-Access Stratum (NAS) entity positioned at a higher layer than the AS entity, a first notification indicating that traffic has to be transferred to the WLAN, in response to reception of the steering command;
   transmitting, to the base station, a report indicating that connection to the WLAN has failed, in response to a failure in the connection to the WLAN after receiving the steering command; and in response to the failure in the connection to the WLAN, releasing the configuration information while providing, to the NAS entity, a second notification indicating that traffic has to be returned from the WLAN, wherein the radio terminal is in a radio resource control (RRC) connected state and is configured with a WWAN-WLAN aggregation from the base station of the WWAN, the radio terminal is configured to be able to use a resume procedure, and the method further comprises:
  when a WLAN communication is resumed from a state where the WLAN communication is unavailable to a state where the WLAN communication is available, transmitting WLAN connection status report including resumption of WLAN communication as information element, to the base station of the WWAN.

\* \* \* \* \*